(12) United States Patent
Hung et al.

(10) Patent No.: US 10,893,291 B2
(45) Date of Patent: Jan. 12, 2021

(54) ULTIMATE MOTION VECTOR EXPRESSION WITH ADAPTIVE DIRECTIONAL INFORMATION SET

(71) Applicant: QUALCOMM Incorporated, San Diego, CA (US)

(72) Inventors: Chao-Hsiung Hung, San Diego, CA (US); Chun-Chi Chen, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/584,875

(22) Filed: Sep. 26, 2019

(65) Prior Publication Data

US 2020/0107043 A1     Apr. 2, 2020

Related U.S. Application Data

(60) Provisional application No. 62/738,468, filed on Sep. 28, 2018.

(51) Int. Cl.
*H04N 19/513*     (2014.01)
*H04N 19/56*     (2014.01)
(Continued)

(52) U.S. Cl.
CPC ......... *H04N 19/521* (2014.11); *H04N 19/105* (2014.11); *H04N 19/139* (2014.11); *H04N 19/176* (2014.11); *H04N 19/56* (2014.11)

(58) Field of Classification Search
CPC .. H04N 19/105; H04N 19/176; H04N 19/139; H04N 19/521; H04N 19/56
See application file for complete search history.

(56) References Cited

U.S. PATENT DOCUMENTS

2020/0099947 A1* 3/2020 Li ..................... H04N 19/176

OTHER PUBLICATIONS

Alshin A., et al., "Description of SDR, HDR and 360° video coding technology proposal by Samsung, Huawei, GoPro, and HiSilicon" "mobile application scenario", 10. JVET Meeting, Apr. 10, 2018-Apr. 20, 2018, San Diego, (the Joint Video Exploration Team of ISO/IEC JTC1/SC29/WG11 and ITU-TSG.16), URL: http://phenix.int-evry.fr/jvet/, No. JVET-J0024-v5, Apr. 14, 2018 (Apr. 14, 2018), XP030151190, 119 Pages, section "3.1.4.4 Ultimate motion vector expression", pp. 53-54, p. 74.

(Continued)

*Primary Examiner* — Obafemi O Sosanya
(74) *Attorney, Agent, or Firm* — Shumaker & Sieffert, P.A.

(57) ABSTRACT

A device and method for coding video data utilizes ultimate motion vector expression (UMVE). The device determines a candidate list from one or more spatial neighboring blocks in a set of spatial neighboring blocks that spatially neighbor a current block of video data. The device may determine a base candidate index, a direction index and a distance index based on data obtained in the bitstream and may use those indices to determine a base candidate, a direction and a distance. The device may also use the direction and distance to calculate a motion vector difference (MVD). The device may determine a prediction block using the MVD and a motion vector of the base candidate, and decode the current block based on the prediction block.

25 Claims, 15 Drawing Sheets

(51) Int. Cl.
H04N 19/139 (2014.01)
H04N 19/176 (2014.01)
H04N 19/105 (2014.01)

(56) References Cited

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC—Software Manual, Retrieved on Aug. 3, 2016, pp. 1-29.
Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.
Bross B., et al., "Versatile Video Coding (Draft 2)", Joint Video Experts Team (JVET) of ITU-T SG 16 WP 3 and ISO/IEC JTC 1/SC 29/WG 11, JVET-K1001-v4, 11th Meeting: Ljubljana, SI, Jul. 10-18, 2018, 86 pages.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.
Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.
Ergen S., "ZigBee/IEEE 802.15.4 Summary", Sep. 10, 2004, 37 pp.
Hashimoto T., et al., "Non-CE4: Enhanced Ultimate Motion Vector Expression", Joint Video Exploration Team (JVET) of ITU-T SG 16 WP 3 and ISO/IEC JTC 1/SC 29/WG 11, JVET-L0355, Oct. 2018, 5 pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/053480—ISA/EPO—dated Jan. 2, 2020.
ITU-T H.265, Series H: Audiovisual and Multimedia Systems, Infrastructure of audiovisual services—Coding of moving video, Advanced video coding for generic audiovisual services, the International Telecommunication Union. Dec. 2016, 664 pp.
Jeong S., et al., "CE4 Ultimate motion vector expression in J0024 (Test 4.2.9)", Joint Video Experts Team (JVET) of ITU-T SG 16 WP 3 and ISO/IEC JTC 1/SC 29/WG 11, JVET-K0115-v1, 11th Meeting: Ljubljana, SI, Jul. 10-18, 2018, 6 pages.
Jeong S., et al., "CE4 Ultimate Motion Vector Expression (Test 4.5.4)", Joint Video Experts Team (JVET) of ITU-T SG 16 WP 3 and ISO/IEC JTC 1/SC 29/WG 11, JVET-L0054, Oct. 3-12, 2018, 5 pages.
Jingya L., et al., "CE4-Related: Improvement on Ultimate Motion Vector Expression", Joint Video Exploration Team (JVET) of ITU-T SG 16 WP 3 and ISO/IEC JTC 1/SC 29/WG 11, JVET-L0408-v2, Oct. 3-12, 2018, 4 pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Yang (Huawei) H., et al., "CE4: Summary Report on Inter Prediction and Motion Vector Coding", 11. JVET Meeting, Jul. 11, 2018-Jul. 18, 2018, Ljubljana, (the Joint Video Exploration Team of ISO/IEC JTC1/SC29/WG11 and ITU-T SG.16), No. JVET-K0024, Jul. 12, 2018, XP030199502, 59 Pages, Retrieved from the Internet: URL: http://phenix.int-evry.fr/jvet/doc_end_user/documents/11_Ljubljana/wg11/JVET-K0024-v4.zip JVET-K0024_r3.docx [retrieved on Jul. 12, 2018].
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, the International Telecommunication Union, Jul. 2001, 74 pp.
Ye J., et al., "CE4: Additional merge candidates (Test 4.2.13), Joint Video Experts Team (JVET) of ITU-T SG 16 WP 3 and ISO/IEO JTC 1/SC 29/WG 11, 11th Meeting: Ljubljana, SI, Jul. 10-18, 2018, JVET-K0286, section 2.4.13 CE4.2.13 in JVET K-286 (Tencent)", 9 pp.

* cited by examiner

ULTIMATE MOTION VECTOR EXPRESSION WITH ADAPTIVE DIRECTIONAL INFORMATION SET

This application claims the benefit of U.S. Provisional Patent Application 62/738,468, filed Sep. 28, 2018, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to inter-prediction and motion vector reconstruction for video coding. For example, this disclosure describes techniques related to ultimate motion vector expression (UMVE) with an adaptive directional information set. The techniques of this disclosure may be applied to existing video codecs, such as HEVC (High Efficiency Video Coding), or may be applied to coding tools in future video coding standards.

In one example, this disclosure describes a method of decoding video data comprising: determining a list of candidates for a current block of the video data from one or more spatial neighboring blocks in a set of spatial neighboring blocks that spatially neighbor the current block of video data; determining, based on data obtained from a bitstream that comprises an encoded representation of the video data, a base candidate index, a direction index and a distance index; determining a base candidate based on the base candidate index; determining a direction based on the direction index; determining a distance based on the distance index; determining a motion vector difference (MVD) based on the direction and the distance; determining a prediction block using the MVD and a motion vector of the base candidate; and decoding the current block based on the prediction block.

In another example, this disclosure describes a device for decoding video data comprising: a memory configured to store a current block of the video data; and one or more processors coupled to the memory, the one or more processors configured to: determine a list of candidates for a current block of the video data from a set of spatial neighboring blocks that spatially neighbor the current block of video data; determine, based on data obtained from a bitstream that comprises an encoded representation of the video data, a base candidate index, a direction index and a distance index; determine a base candidate based on the base candidate index; determine a direction based on the direction index; determine a distance based on the distance index; determine a motion vector difference (MVD) based on the direction and the distance; determine a prediction block using the MVD and a motion vector of the base candidate; and decode the current block based on the prediction block.

In another example, this disclosure describes a device for encoding video data comprising a memory configured to store a current block of the video data; and one or more processors coupled to the memory, the one or more processors configured to: determine a list of candidates for the current block of video data from spatial neighboring blocks in a set of spatial neighboring blocks that spatially neighbor the current block of the video data; determine a base candidate for the current block of video data; determine a direction resolution based on motion vectors of one or more base candidates; determine a distance resolution based on the motion vectors of the one or more base candidates; determine a base candidate index, a direction index and a distance index based upon the one or more base candidates, the direction resolution and the distance resolution; encode the base candidate index, the direction index and the distance index into a bitstream; determine a motion vector difference (MVD) based on a direction and a distance associated with the direction index and the distance index; determine a prediction block using the MVD and a motion vector of the one or more base candidates; and encode the current block based on the prediction block. In yet another example, this disclosure describes a device for decoding video data comprising: means for determining a candidate list of one or more spatial neighboring blocks in a set of spatial neighboring blocks that spatially neighbor for a current block of the video data; means for determining, based on data obtained from a bitstream that comprises an encoded representation of the video data, a base candidate, a direction index and a distance index; means for determining a base candidate based on the base candidate index; means for determining a direction based on the direction index; means for determining a distance based on the distance index; means for determining a motion vector difference (MVD) based on the direction and the distance; means for determining a prediction block using the MVD and a motion vector of the base candidate; and means for decoding the current block based on the prediction block. The details of one or more examples are set forth in the accompanying drawings and the description below. Other features, objects, and advantages will be apparent from the description, drawings, and claims.

DETAILED DESCRIPTION

In general, this disclosure describes techniques related to inter-prediction and motion vector reconstruction for video coding. For example, this disclosure describes techniques related to ultimate motion vector expression (UMVE) with an adaptive directional information set. The techniques of this disclosure may be applied to existing video codecs, such as HEVC (High Efficiency Video Coding), or may be applied to coding tools in future video coding standards. Specifically, a video coding device determines a candidate list. A video coding device determines a direction resolution and determines a distance resolution. The video coding device determines a base candidate index, a direction index and a distance index. These indices may be transmitted in a bitstream from an encoder to a decoder. A video coding device determines a direction and a distance based upon information in the indices. A video coding device determines an MVD. A video coding device determines a prediction block and codes the current block based on the prediction block.

Existing designs of UMVE all utilize fixed directional information sets for motion vector expression. These fixed directional information sets can result in a large amount of information being coded as frequent adjustments to the motion vectors must be coded, thus deteriorating the UMVE coding performance.

Rather than coding the frequent adjustments to the motion vectors, a video coder may dynamically adapt the directional information sets for motion vector expression including the direction resolution and distance resolution. The video coder may derive the direction resolution and distance resolution from a spatial neighboring block and use this information to adapt the directional information sets. This would reduce the side information, such as frequent and large adjustments to motion vectors, being transmitted from an encoder to a decoder.

As such, the techniques of this disclosure may enable a video coding device to utilize UMVE and determine a candidate list, determine base candidate, direction and distance indices, determine a base candidate, a direction and a distance, determine a MVD, determine a prediction block and decode based on the prediction block.

Figure 1:
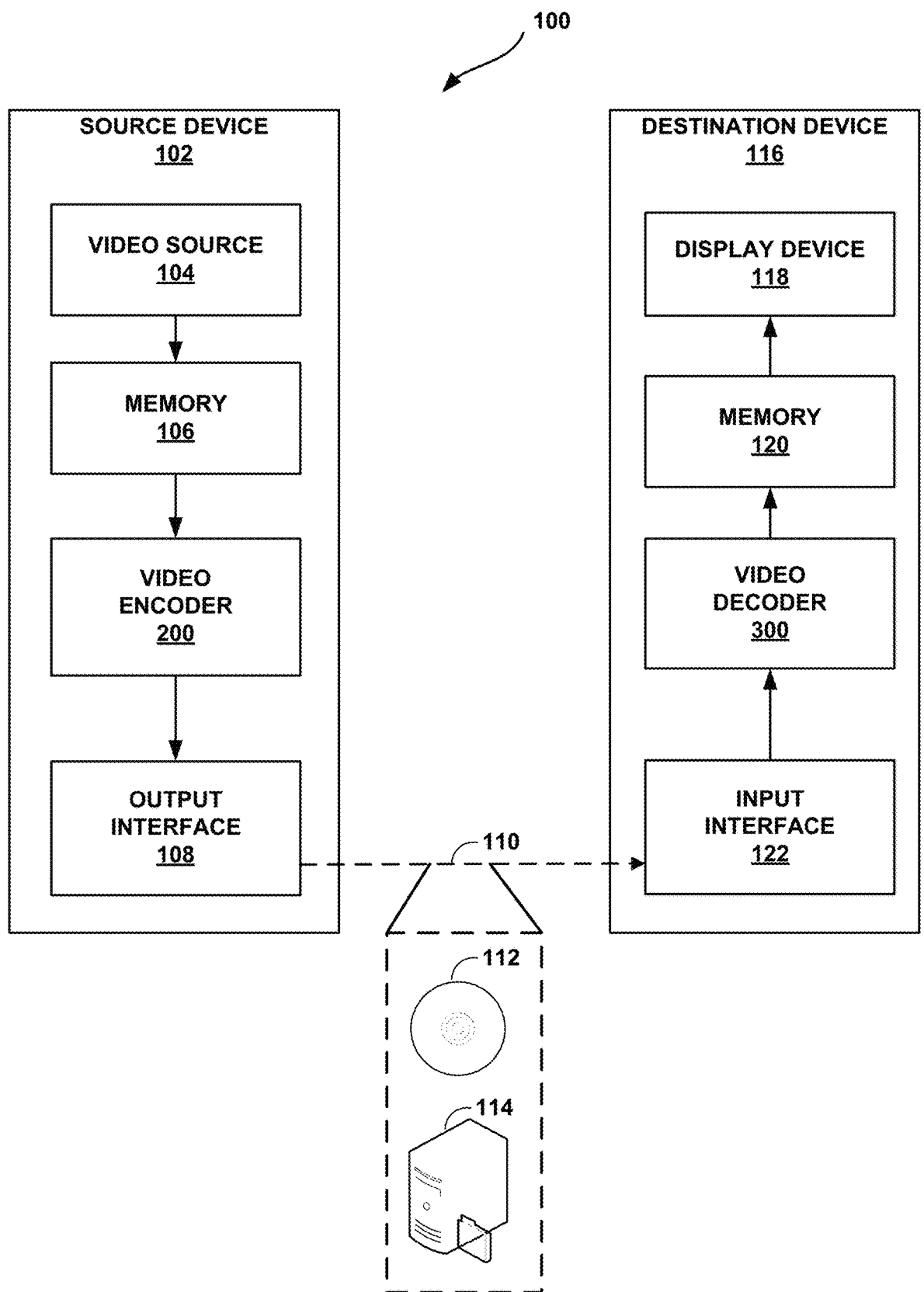
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for inter-prediction and motion vector reconstruction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for inter-prediction and motion vector reconstruction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. System 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry codecs or standards, such as the Joint Exploration Test Model (JEM) or Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes spatial neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance the techniques of this disclosure, video encoder 200 and video decoder 300 may be configured to use ultimate motion vector expression (UMVE).

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
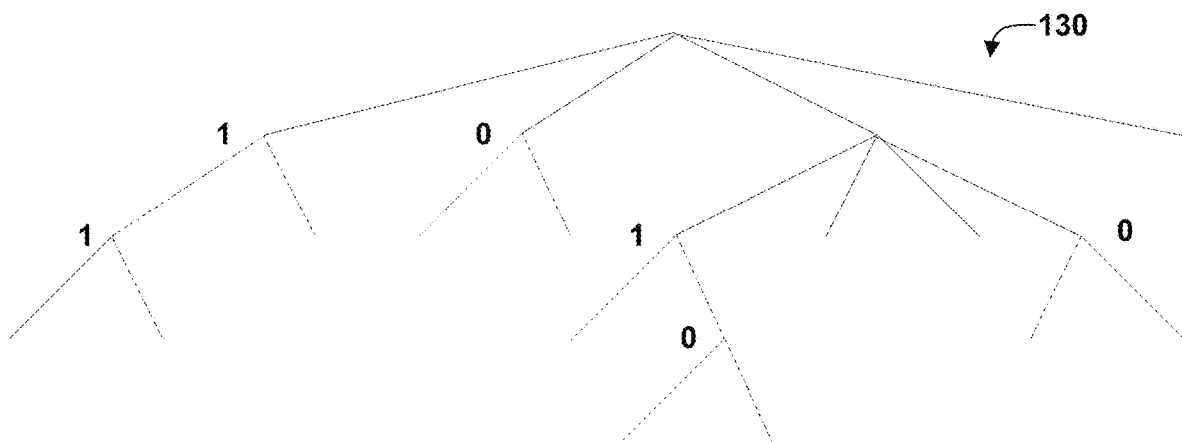
FIGS. 2A and 2B are conceptual diagrams illustrating an example quadtree binary tree (QTBT) structure, and a corresponding coding tree unit (CTU).
Figure 2B:
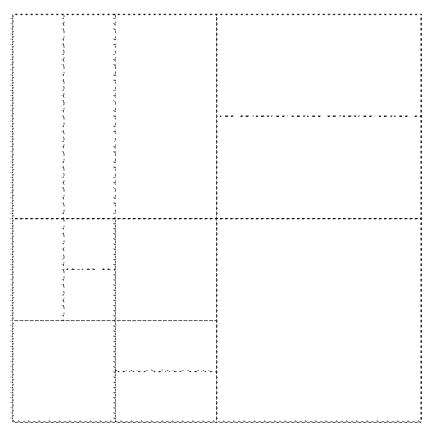

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (Min QTSize, representing a minimum allowed quadtree leaf node size), a maximum binary tree size (Max BTSize, representing a maximum allowed binary tree root node size), a maximum binary tree depth (Max BTDepth, representing a maximum allowed binary tree depth), and a minimum binary tree size (Min BTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (Max BTSize), they can be further partitioned by respective binary trees. The binary tree splitting of one node can be iterated until the nodes resulting from the split reach the minimum allowed binary tree leaf node size (Min BTSize) or the maximum allowed binary tree depth (Max BTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the Min QTSize is set as 16×16, the Max BTSize is set as 64×64, the Min BTSize (for both width and height) is set as 4, and the Max BTDepth is set as 4. The quadtree partitioning is applied to the CTU first to generate quad-tree leaf nodes. The quadtree leaf nodes may have a size from 16×16 (i.e., the Min QTSize) to 128×128 (i.e., the CTU size). If the leaf quadtree node is 128×128, it will not be further split by the binary tree, since the size exceeds the Max BTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches Max BTDepth (4, in this example), no further splitting is permitted. When the binary tree node has width equal to Min BTSize (4, in this example), it implies no further horizontal splitting is permitted. Similarly, a binary tree node having a height equal to Min BTSize implies no further vertical splitting is permitted for that binary tree node. As noted above, leaf nodes of the binary tree are referred to as CUs and are further processed according to prediction and transform without further partitioning.

Figure 3:
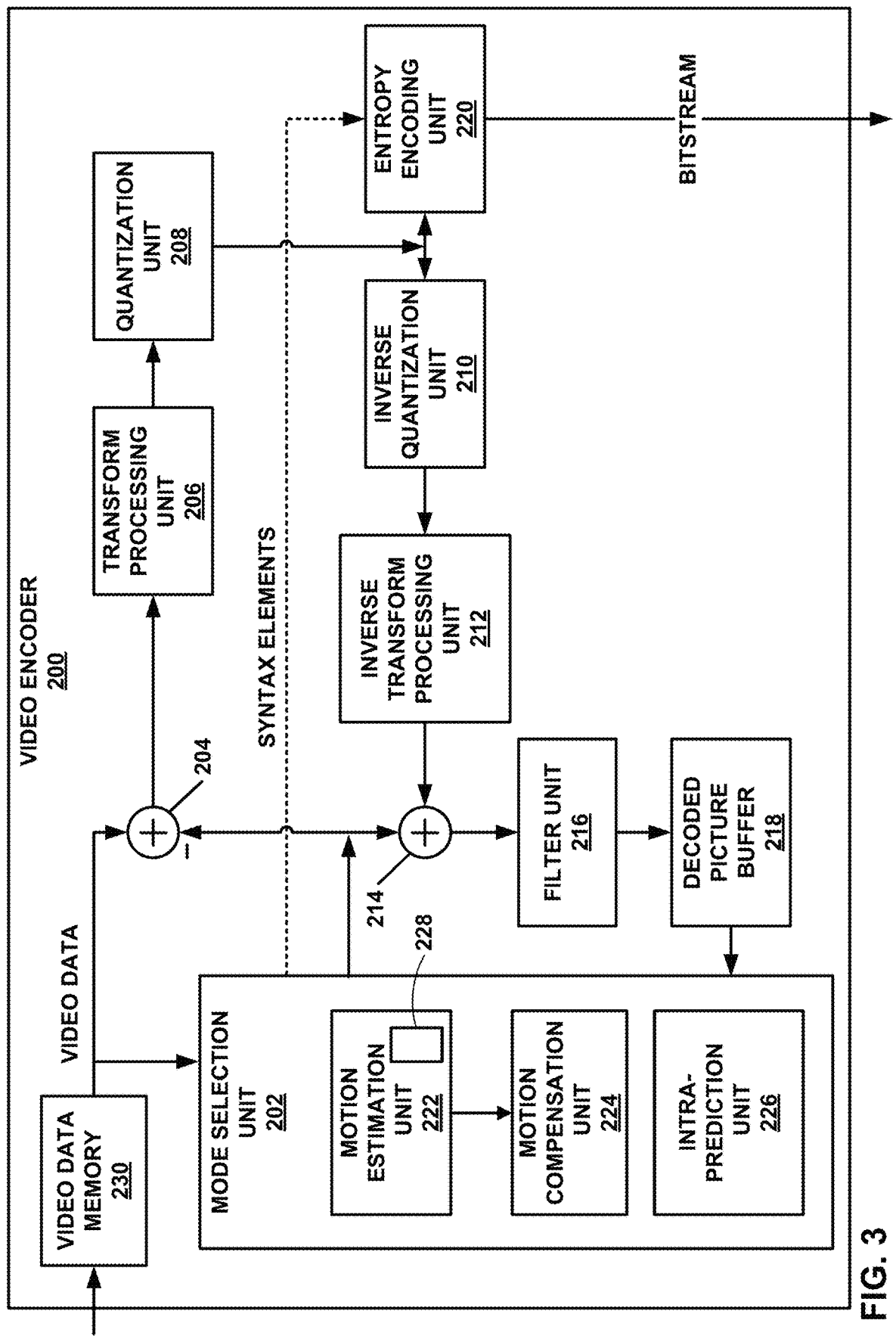
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. The units may be implemented as one or more circuits or logic elements as part of hardware circuitry, or as part of a processor, ASIC or FPGA. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

In some examples, motion estimation unit 222 may contain UMVE unit 228. While UMVE unit 228 is shown in motion estimation unit 222, in some examples it may be in motion compensation unit 224. In other examples, the UMVE 228 unit may be split between or replicated in motion estimation unit 222 and motion compensation unit 224. The motion estimation unit 222 may determine a list of candidates for the current block of one or more spatial neighboring blocks in a set of spatial neighboring blocks that spatially neighbor a current block of the video data. The motion estimation unit 222 may determine a base candidate in the list of candidates. The base candidate may be denoted MVbase. The motion estimation unit 222 or the UMVE unit 228 may determine a direction resolution, e.g., based on motion vectors of one or more base candidates. Additionally, the motion estimation unit 222 or the UMVE unit 228 may determine a distance resolution, e.g., based on the motion vectors of the one or more base candidates.

The UMVE unit 228 may determine a set of motion vector differences (MVDs). The UMVE unit 228 may determine each of the MVDs as a combination of a direction having the determined direction resolution and a distance having the determined distance resolution. For each of the MVDs, the UMVE unit 228 may determine a rate-distortion (RD) cost associated with the MVD. The RD cost associated with the MVD may be an RD cost associated with encoding the current block using a motion vector resulting from adding the MVD to the base candidate (MVbase). The UMVE unit 228 may repeat this process for each of the MVDs.

The UMVE unit 228 may select the MVD with the minimum RD cost and add the selected MVD to the base candidate (MVbase) to determine a final motion vector. The final motion vector may be denoted as MVfinal. MCU 224 may then determine a prediction block using the final motion vector. The video encoder 200 may encode the current block based on the prediction block. For instance, to encode the current block based on the prediction block, the video encoder 200 (e.g., the residual generation unit 204 of the video encoder 200) may determine residual data indicating differences between samples in the prediction block and samples in the current block. The video encoder 200 may then process the residual data as described elsewhere in this disclosure. For instance, the transform processing unit 206, the quantization unit 208, and the entropy encoding unit 220 may process the residual data.

The video encoder 200 may signal, in a bitstream that comprises an encoded representation of the video data, data indicating the base candidate, a direction index of the selected MVD, and a distance index of the selected MVD. The base candidate index may indicate a base candidate defined in a candidate list. The direction index may indicate a direction defined in a direction table that may closely correspond to the determined direction resolution. The distance index may indicate a distance defined in a distance table that may closely correspond to the determined distance resolution.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. The one or more motion vectors may be used in the UMVE unit 228 to determine a motion vector difference (MVD) by combining the direction and the distance.

Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors.

For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples spatially neighboring the current block. For example, for directional modes, intra-prediction unit 226 may generally mathematically combine values of spatial neighboring samples and populate these calculated values in the defined direction across the current block to produce the prediction block. As another example, for DC mode, intra-prediction unit 226 may calculate an average of the spatial neighboring samples to the current block and generate the prediction block to include this resulting average for each sample of the prediction block.

Mode selection unit 202 provides the prediction block that was determined by the motion compensation unit 224 to the residual generation unit 204. The residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra-prediction, and symmetric PU sizes of 2N×2N, 2N×N, N×2N, N×N, or similar for inter-prediction. Video encoder 20 and video decoder 30 may also support asymmetric partitioning for PU sizes of 2N×nU, 2N×nD, nL×2N, and nR×2N for inter-prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block using the UMVE 228, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by the motion compensation unit 224 in the mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform the improved UMVE techniques of this disclosure.

Figure 4:
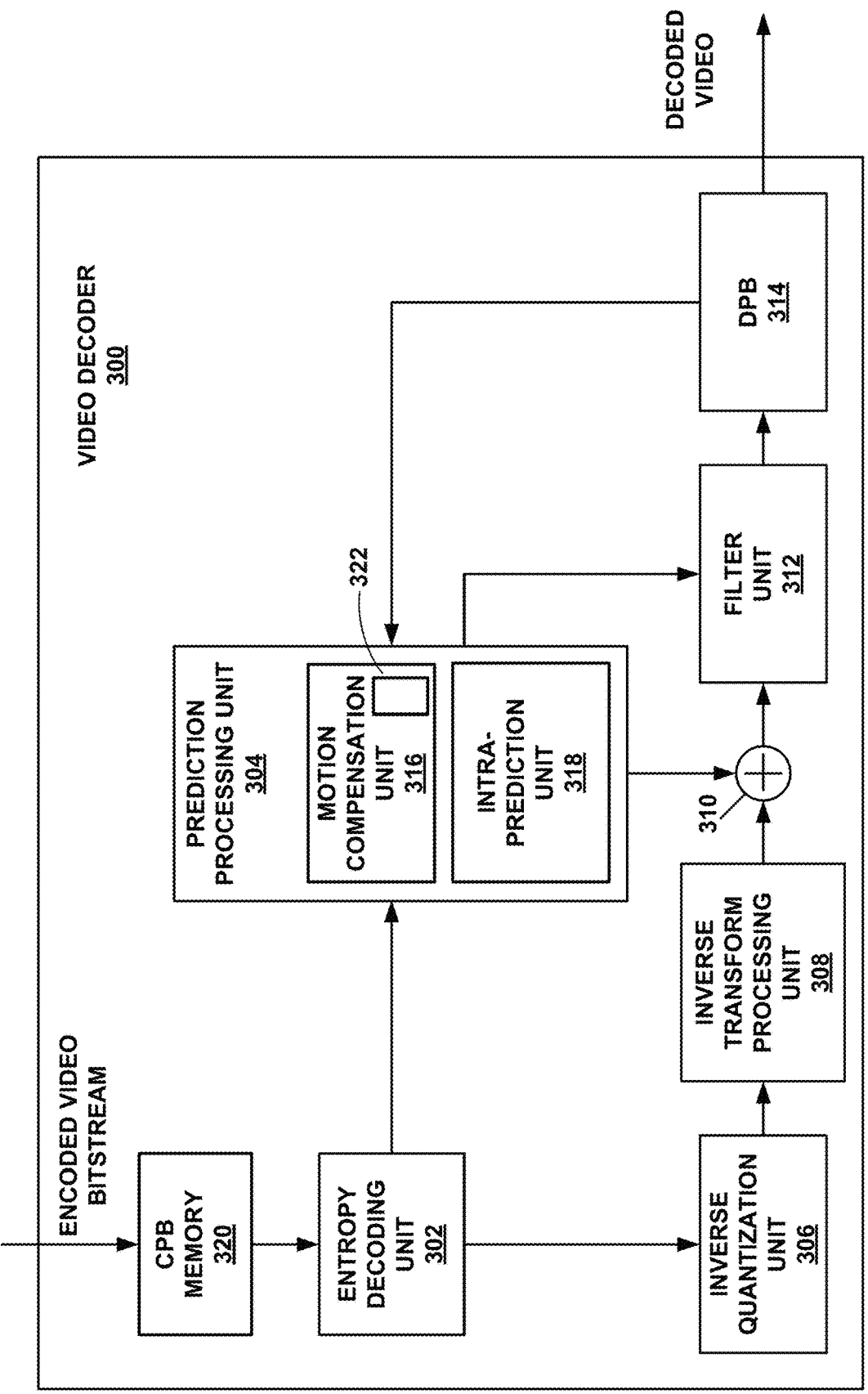
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to implement other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Motion compensation unit may include UMVE unit 322. UMVE unit 322 may determine MVDs as described hereinafter. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. The units may be implemented as one or more circuits or logic elements as part of hardware circuitry, or as part of a processor, ASIC or FPGA. Similar to FIG. 3, fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 may generate a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Prediction processing unit may include motion compensation unit 316. Motion compensation unit 316 may include UMVE unit 322. Motion compensation unit 316 may generally perform the inter-prediction process in a manner that is substantially similar to that described with respect to motion compensation unit 224 (FIG. 3).

Motion compensation unit 316 may contain UMVE unit 332. In some examples motion compensation unit 316 may determine a candidate list of one or more spatial neighboring blocks that spatially neighbor a current block of the video data. The video decoder 300 may receive in a bitstream (e.g., the encoded video bitstream of FIG. 4) representing video data, data representing a base candidate index, a direction index and a distance index. The base candidate index may indicate a base candidate defined in a candidate list, the direction index may indicate a direction defined in a direction table and the distance index may indicate a distance defined in a distance table. The motion compensation unit 316 or the UMVE unit 332 may determine the base candidate(s) based on the base candidate index. The motion compensation unit 316 or the UMVE 332 may determine a direction based on the direction index. The motion compensation unit 316 or the UMVE unit 332 may also determine a distance based on the distance index. The UMVE unit 332 may determine an MVD based on the direction and the distance. The motion compensation unit 316 may determine a prediction block using the MVD and a motion vector of the base candidate(s). The video decoder 300 (e.g., the entropy decoding unit 302, the inverse quantization unit 306, the inverse transform processing unit 308, the reconstruction unit 310, the filter unit 312 and the decoded buffer unit 314) may then decode the current block based on the prediction block. For instance, to decode the current block based on the prediction block, video decoder 300 (e.g., reconstruction unit 310) may add samples of the prediction block (e.g., from prediction processing unit 304) to corresponding residual samples (e.g., from inverse transform processing unit 308) in order to obtain reconstructed samples of the current block. While UMVE unit 332 is shown in motion compensation unit 316, in some examples, it may be located elsewhere in the video decoder 300 or may be split between motion compensation unit 316 and other portions of the video decoder 300.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of spatial neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform the UMVE techniques of this disclosure.

Figure 5:
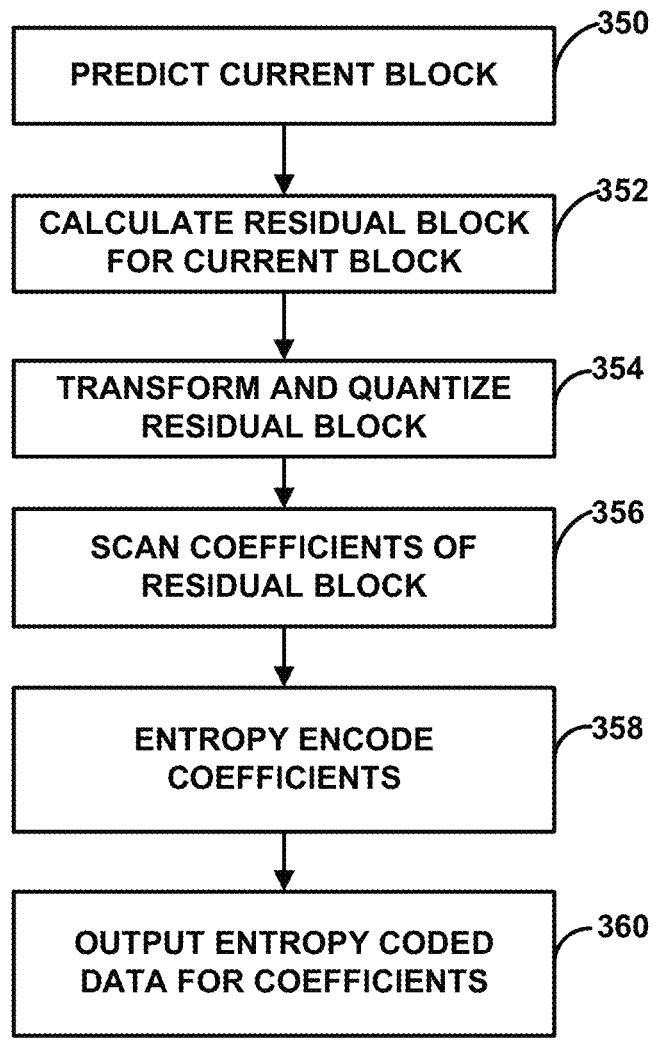
FIG. 5 is a flowchart illustrating an example operation of a video encoder.

Video encoder 200 and video decoder 300 may encode and decode video data using UMVE according to techniques of this disclosure. It may be helpful to describe the encoding and decoding processes. FIG. 5 is a flowchart illustrating an example method for encoding a current block. The current block may comprise a current CU. Although described with respect to video encoder 200 (FIGS. 1 and 2), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 6:
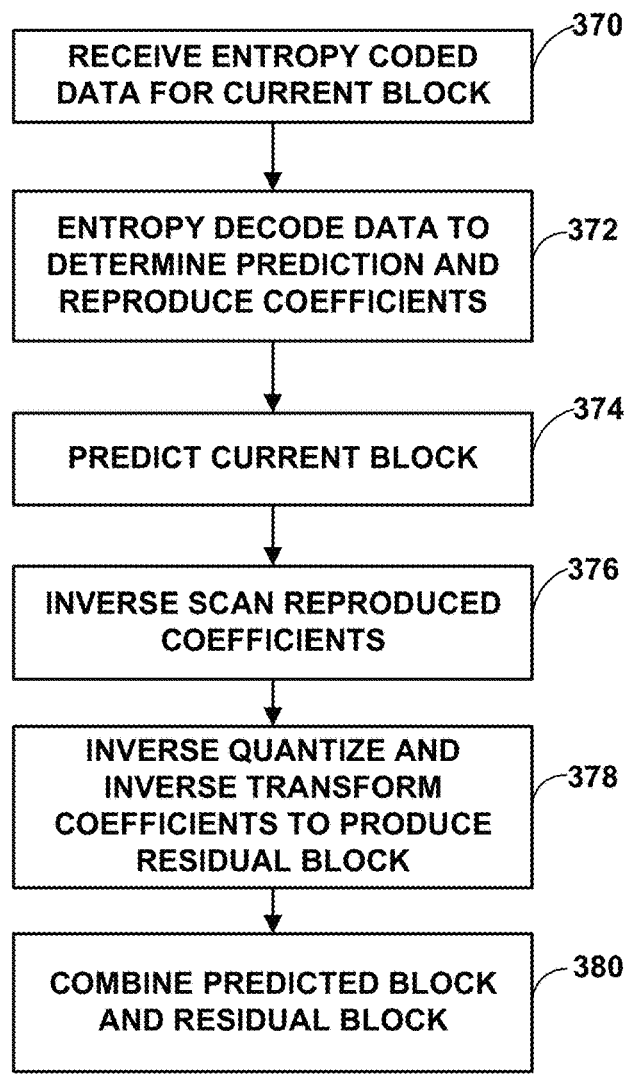
FIG. 6 is a flowchart illustrating an example operation of a video decoder.

FIG. 6 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 6.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. The JVET first met during 19-21 Oct. 2015. J. Chen, E. Alshina, G. J. Sullivan, J.-R. Ohm, J. Boyce, "Algorithm Description of Joint Exploration Test Model 7", JVET-G1001, July 2017 is an algorithm description of Joint Exploration Test Model 7 (JEM-7). The JVET is currently developing the Versatile Video Coding (VVC) standard based on the JEM. Bross et al., "Versatile Video Coding (Draft 2)," Joint Video Experts Team (JVET) of ITU-T SG 16 WP 3 and ISO/IEC JTC 1/SC 29/WG 11, 11$^{th}$ Meeting, Ljubljana, SI, 10-18 Jul. 2018, document JVET-K1001 (hereinafter, "JVET-K1001") is a draft of the VVC standard.

In HEVC, the largest coding unit in a slice is called a coding tree block (CTB) or a coding tree unit (CTU). A CTB contains a quad-tree, the nodes of which are coding units. The size of a CTB can range from 16×16 to 64×64 in the HEVC main profile (although technically 8×8 CTB sizes can be supported). A CU may be the same size as a CTB, although a CU can be as small as 8×8. Furthermore, each CU is coded with one mode (i.e., either inter-coded or intra-coded). When a CU is inter-coded, the CU may be further partitioned into 2 or 4 PUs or become just one PU when further partition does not apply. When two PUs are present in one CU, the two PUs can be half size rectangles or two rectangle sizes of ¼ or ¾ the size of the CU. When the CU is inter-coded, one set of motion information is present for each PU. In addition, each PU is coded with a unique inter-prediction mode to derive the set of motion information.

In HEVC, there are two inter-prediction modes, named merge mode (with skip being considered as a special case of merge mode) and advanced motion vector prediction (AMVP) mode, respectively for a PU. In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors. However, under AMVP mode, for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 7A:
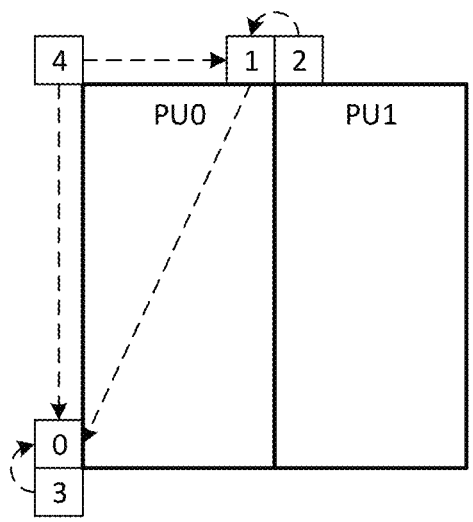
FIGS. 7A-7B are conceptual diagrams illustrating spatial neighboring motion vector candidates for merge and advanced motion vector prediction (AMVP) modes.
Figure 7B:
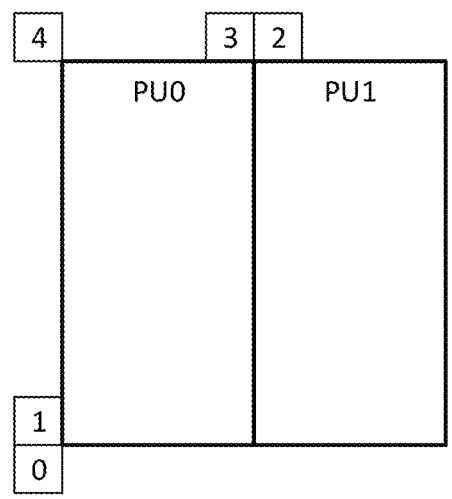

Spatial MV candidates are derived from the neighboring blocks shown in FIG. 7A and FIG. 7B, for a specific PU ($PU_0$), although the methods generating the candidates from the blocks differ for merge and AMVP modes.

In merge mode, up to four spatial MV candidates can be derived with the order shown in FIG. 7A. Specifically, the order is as follows: left (0), above (1), above right (2), below left (3), and above left (4).

In AMVP mode, the spatial neighboring blocks are divided into two groups. The first group is a left group consisting of the block 0 and 1. The second group is an above group consisting of the blocks 2, 3, and 4, as shown in FIG. 7B. For each group, the potential candidate in a spatial neighboring block referring to the same reference picture as that indicated by the signaled reference index has the highest priority to be chosen to form a final candidate of the group. It is possible that all spatial neighboring blocks do not contain a motion vector pointing to the same reference picture. Therefore, if such a candidate cannot be found, the first available candidate will be scaled to form the final candidate, thus the temporal distance differences can be compensated.

Figure 8B:
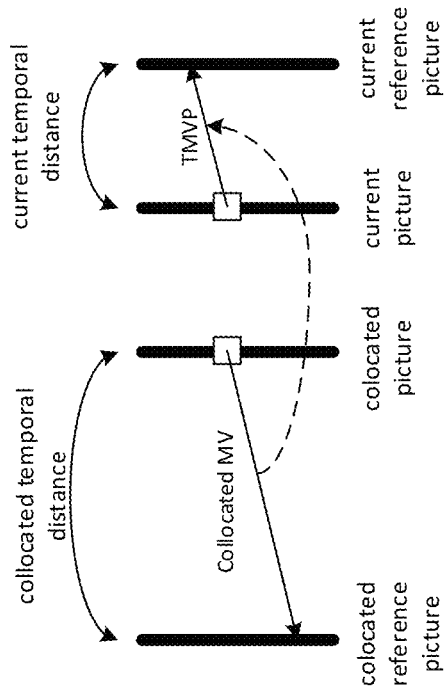
FIGS. 8A-8B are conceptual diagrams illustrating a temporal motion vector prediction (TMVP) candidate and motion vector scaling.
Figure 8A:
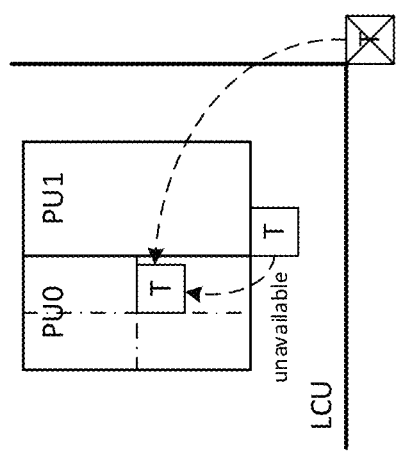

FIGS. 8A and 8B are conceptual diagrams illustrating temporal motion vector prediction (TMVP) candidates. FIG. 8A shows an example of a TMVP candidate. A TMVP candidate, if enabled and available, is added into the MV candidate list after spatial motion vector candidates. The process of motion vector derivation for TMVP candidate is the same for both merge and AMVP modes, however the target reference index for the TMVP candidate in the merge mode is always set to 0.

The primary block location for TMVP candidate derivation is the bottom right block outside of the collocated PU as shown in FIG. 8A as a block "T", to compensate the bias to the above and left blocks used to generate spatial neighboring candidates. However, if that block is located outside of the current CTB row or motion information is not available, the block is substituted with a center block of the PU.

A motion vector for TMVP candidate is derived from the co-located PU of the co-located picture, indicated in the slice level. The motion vector for the co-located PU is called a co-located MV.

FIG. 8B shows an example of MV scaling. To derive the TMVP candidate motion vector, the co-located MV needs to be scaled to compensate the temporal distance differences, as shown in FIG. 8B.

Several other aspects of merge and AMVP modes are worth mentioning as follows. For example, the video encoder 200 and the video decoder 300 may perform motion vector scaling. It is assumed that the value of motion vectors is proportional to the distance of pictures in the presentation time. A motion vector associates two pictures, the reference picture, and the picture containing the motion vector (namely, the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. The video encoder 200 and the video decoder 300 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In another example, the video encoder 200 and the video decoder 300 may perform artificial motion vector candidate generation. If a motion vector candidate list is not complete, artificial motion vector candidates may be generated and inserted at the end of the list until it will have all candidates.

In merge mode, there are two types of artificial MV candidates: combined candidates derived only for B-slices and zero candidates used only if the first type does not provide enough artificial candidates. A zero candidate is a candidate that specifies motion vectors with 0 magnitude. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

In another example, the video encoder 200 and the video decoder 300 may perform a pruning process for candidate insertion. Candidates from different blocks may happen to be the same, which decreases the efficiency of a merge/AMVP candidate list. A pruning process may be applied to solve this problem. The pruning process compares one candidate against the others in the current candidate list to avoid inserting identical candidates to a certain extent. To reduce complexity, the pruning process is applied to a limited number of candidates instead of comparing each potential candidate with all the other candidates.

The video encoder 200 may signal motion vector differences (MVDs) (between the motion vector and predicted motion vector of a PU) in units of quarter luma samples (pixels) when use_integer_mv_flag is equal to 0 in the slice header, as is specified in HEVC. Alternatively, the video encoder 200 may signal MVDs in units of quarter luma samples, integer luma samples or four luma samples, as is specified in JEM. The MVD resolution may be controlled at the CU level, and MVD resolution flags are conditionally signalled for each CU that has at least one non-zero MVD components.

For a CU that has at least one non-zero MVD component, the video encoder 200 may signal a first flag to indicate whether quarter luma sample MV precision is used in the CU. The first flag being equal to 1 indicates that quarter luma sample MV precision is not used and another flag is set to indicate whether integer luma sample MV precision or four luma sample MV precision is used.

When the first MVD resolution flag of a CU is zero, or not coded for a CU (meaning all MVDs in the CU are zero), the video encoder 200 and the video decoder 300 use quarter luma sample MV resolution for the CU. When the video encoder 200 and the video decoder 300 use integer-luma sample MV precision or four-luma-sample MV precision for a CU, the video encoder 200 and the video decoder 300 round the MVPs in the AMVP candidate list to the corresponding precision.

The video encoder 200 and the video decoder 300 may use CU-level rate-distortion (RD) checks to determine which MVD resolution is to be used for a CU. That is, the CU-level RD check is performed three times for each MVD resolution. To accelerate video encoder 200, the following encoding schemes, labeled (1) and (2) in the following paragraphs, may be applied in JEM.

(1) During an RD check of a CU with normal quarter luma sample MVD resolution, video encoder 200 stores the motion information of the current CU (integer luma sample accuracy). The stored motion information (after rounding) is used as the starting point for further small range motion vector refinement during the RD check for the same CU with integer luma sample and 4 luma sample MVD resolution so that the time-consuming motion estimation process is not replicated three times.

(2) The video encoder 200 and the video decoder 300 may conditionally invoke an RD check of a CU with 4 luma sample MVD resolution. For a CU, when RD cost integer luma sample MVD resolution is much larger than that of quarter luma sample MVD resolution, the RD check of 4 luma sample MVD resolution for the CU may be skipped.

Ultimate Motion Vector Expression (UMVE) is described in S. Jeong et al, "CE4 Ultimate motion vector expression in JVET-J0024 (Test 4.2.9)", JVET-K0115, July 2018 (hereinafter, "JVET-J0024"), and S. Jeong et al, "CE4 Ultimate motion vector expression (Test 4.5.4)", JVET-L0054, October 2018 (hereinafter, "JVET-L0054"). UMVE may be used for either skip or merge modes with a proposed motion vector expression method. The video encoder 200 and the video decoder 300 may re-use merge candidates. Among the merge candidates, a candidate can be selected, and is further expanded by the proposed motion vector expression method. UMVE provides motion vector expression with simplified signaling. The expression method includes a starting point, a motion magnitude, and a motion direction.

UMVE uses a merge candidate list as merge candidate lists are described in HEVC. However, only candidates which are default merge type (e.g., MRG_TYPE_DEFAULT_N) are considered for UMVE's expansion.

Figure 9:
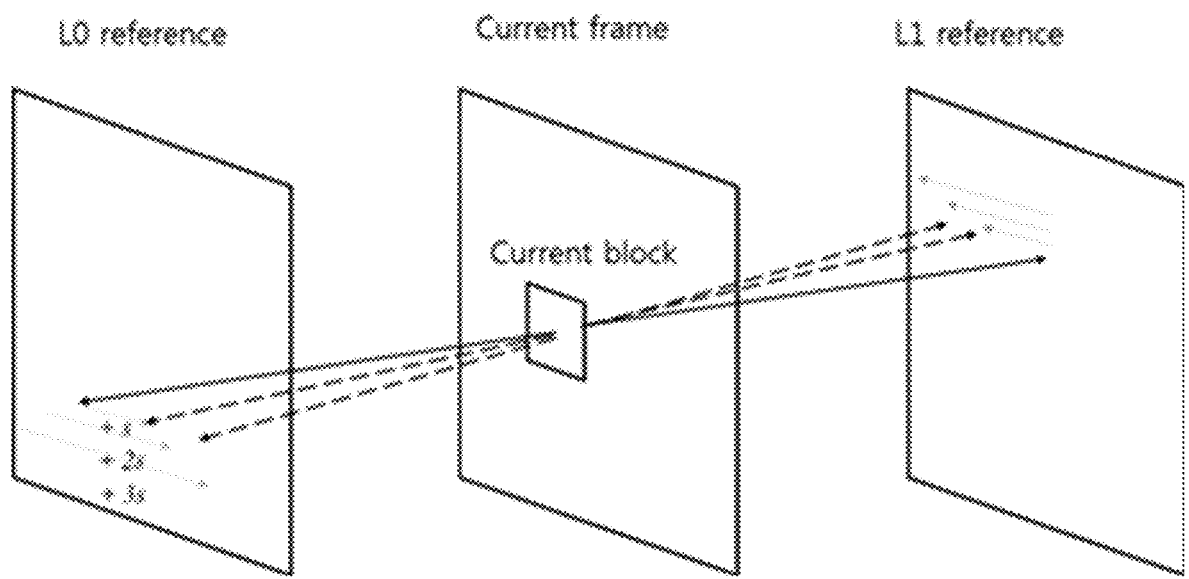
FIG. 9 is a conceptual diagram illustrating an Ultimate Motion Vector Expression (UMVE) search process.
Figure 10:
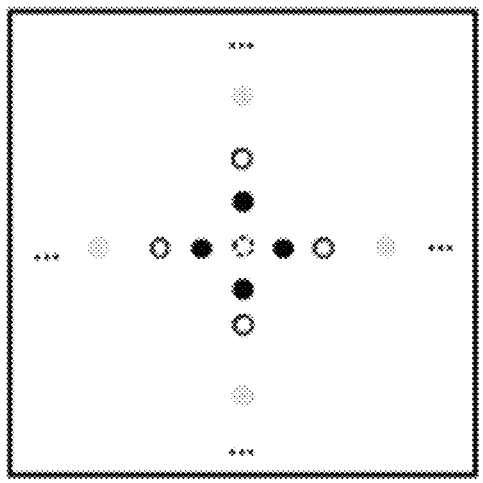
FIG. 10 is a conceptual diagram illustrating UMVE search points.
Figure 10:
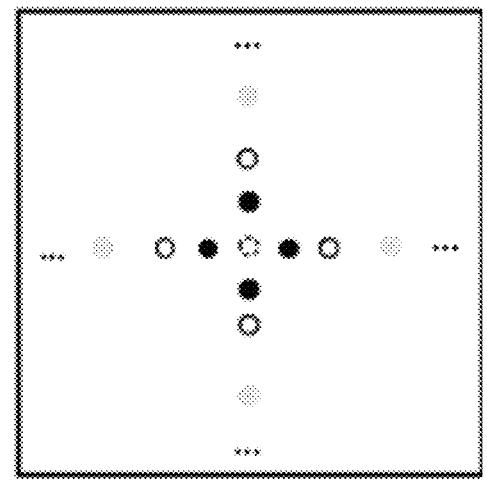

FIG. 9 is a conceptual diagram illustrating an UMVE search process and FIG. 10 is a conceptual diagram illustrating UMVE search points. For example, video encoder 200 may search for a block similar to a current block in one or more reference pictures. In FIG. 9, a current block in a current frame is depicted between an L0 reference picture and an L1 reference picture. Prediction direction information indicates a prediction direction among L0, L1 and L0 and L1 predictions. In a B slice, the video encoder 200 and the video decoder 300 can generate bi-prediction candidates from merge candidates with uni-prediction by using mirroring technique as shown FIGS. 9 and 10. For example, a prediction of a direction one pixel to the right in L0 (a dark circle in FIG. 10) would be mirrored to one pixel to the left in L1 (also a dark circle in FIG. 10). In another example, a prediction of a direction of two pixels up in L0 (an unfilled circle in FIG. 10) would be mirrored to two pixels down in L1 (also an unfilled circle in FIG. 10).

In a B slice, the video encoder 200 and the video decoder 300 may intra-predict, uni-directionally inter-predict, or bi-directionally inter-predict a block. For example, if a merge candidate is uni-predicted with L1, a reference index of L0 is decided by searching a reference picture in list 0, which is mirrored with the reference picture for list 1. If there is no corresponding picture, the nearest reference picture to the current picture is used. L0's MV is derived by scaling L1's MV. The scaling factor is calculated by POC distance.

The video encoder 200 may signal a UMVE prediction direction index for a block. The prediction direction index may have one or two bits. If the prediction direction of the UMVE candidate is the same as one of the original merge candidates, a first (and only) bit of the prediction direction index has a value of 0. However, if the prediction direction of the UMVE candidate is not the same as one of the original merge candidates, the first bit of the prediction direction index has a value of 1. After sending the first bit of the UMVE prediction direction index, video encoder 200 may signal a second bit of the UMVE prediction direction index. The second bit of the UMVE prediction direction index indicates a prediction direction of the UMVE candidate. The prediction direction of the UMVE candidate may be signaled based on a pre-defined priority order of UMVE prediction directions.

The priority order of the UMVE prediction directions is L0/L1 prediction, L0 prediction and L1 prediction. For example, if the prediction direction of the merge candidate is L1, video encoder 200 signals '0' as the UMVE prediction direction index to indicate that the prediction direction of the UMVE candidate is L1. In this example, video encoder 200 may signal '10' as the UMVE prediction direction index to indicate that the prediction direction of the UMVE candidate is L0 and L1. Furthermore, in this example, video encoder 200 may signal '11' as the UMVE prediction direction index to indicate that the prediction direction of the UMVE candidate is L0. Thus, if the prediction direction of the UMVE candidate matches the prediction direction of the merge candidate, the UMVE prediction direction index only has 1 bit. If L0 and L1 prediction lists are the same, the video encoder 200 does not signal the UMVE prediction direction information.

The base candidate index in Table 1 defines the starting point for selecting candidates for the MVP. The base candidate index indicates the best candidate among candidates in the list. The video encoder 200 may signal a base candidate index to indicate to the video decoder 300 which base candidate is the best candidate. For example, the video encoder 200 may signal a 0 if the best candidate is the $1^{st}$ MVP. If the number of base candidates is equal to 1, base candidate index (i.e., Base candidate IDX) is not signaled.

TABLE 1

| Base candidate IDX | | | | |
|---|---|---|---|---|
| | Base candidate IDX | | | |
| | 0 | 1 | 2 | 3 |
| $N^{th}$ Motion Vector Predictor (MVP) | $1^{st}$ MVP | $2^{nd}$ MVP | $3^{rd}$ MVP | $4^{th}$ MVP |

The distance index in Table 2 is motion magnitude information. The distance index indicates the pre-defined distance from the starting point (the base candidate). The video encoder 200 may signal a distance index to indicate the distance of an MV. For example, the video encoder 200 may signal a 4 if the distance of the MV is 4-pels.

TABLE 2

Distance IDX

| | Distance IDX | | | | | | |
|---|---|---|---|---|---|---|---|
| 0 | 1 | 2 | 3 | 4 | 5 | 6 | 7 |
| Pixel distance 1/4-pel | 1/2-pel | 1-pel | 2-pel | 4-pel | 8-pel | 16-pel | 32-pel |

The direction index in Table 3 represents the direction of the MVD relative to the starting point. The direction index can represent four directions, namely up, down, left, and right. The video encoder 200 may signal a direction index to indicate to the video decoder 300 a direction of an MV. For example, the video encoder may signal a 10 if the direction is up.

TABLE 3

Direction IDX

| | Direction IDX | | | |
|---|---|---|---|---|
| | 00 | 01 | 10 | 11 |
| x-axis | + | − | N/A | N/A |
| y-axis | N/A | N/A | + | − |

Flags are used in video coding to signal to the video decoder 300 that the video encoder 200 has encoded a block of the video data using a particular mode. For example, if the video encoder 200 is using skip mode for a block, it may signal a skip flag that indicates that the block is encoded using the skip mode. If the video encoder 200 is using merge mode for a block, the video encoder 200 may signal a merge flag that indicates that the block is encoded using merge mode. If the video encoder 200 is using UMVE for a block, the video encoder 200 may signal a UMVE flag that indicates that the block is encoded using UMVE. If the video encoder 200 is using an affine mode for a block, the video encoder 200 may signal an affine flag that indicates that the block is encoded using affine mode.

The video encoder 200 may signal the UMVE flag right after sending a skip flag and a merge flag. If the skip and merge flag are true, the video decoder 300 parses the UMVE flag. If the UMVE flag is equal to 1, this indicates UMVE is being used and the UMVE syntaxes are parsed. If the UMVE flag is not equal to 1, the video decoder 300 parses an AFFINE flag. The AFFINE flag being equal to 1 indicates the AFFINE mode. If the AFFINE flag is not equal to 1, a skip/merge index is parsed for VTM's skip/merge mode.

An additional line buffer due to the UMVE candidates is not needed because a skip/merge candidate is directly used as a base candidate. Using the input UMVE index, any adjustment to the MV is decided right before motion compensation. Thus, there may be no need for a long line buffer.

An enhanced version of UMVE described in T. Hashimoto et al, "Non-CE4: Enhanced ultimate motion vector expression," JVET-L0355, October 2018 (hereinafter, "JVET-L0355"), provides two changes to extend the original UMVE (described in JVET-L0054) as follows: 1) enhances the number of directions from 4 into 8 as shown in Table 4 below; and 2) uses multiple distance lists as shown in Tables 5 and 6 below.

TABLE 4

Motion direction

| | Direction IDX | | | | | | | |
|---|---|---|---|---|---|---|---|---|
| | 000 | 001 | 010 | 011 | 100 | 101 | 110 | 111 |
| x-axis | +1 | −1 | 0 | 0 | +1/2 | −1/2 | −1/2 | +1/2 |
| y-axis | 0 | 0 | +1 | −1 | +1/2 | −1/2 | +1/2 | −1/2 |

The direction index in Table 4 represents the 8 directions. As can be seen, the value of the x-axis and y-axis of the diagonal direction are half that of the horizontal and vertical direction respectively.

Considering that the amount of distance (motion difference) would be different from the area and sequence characteristics, JVET-L0355 describes two distance lists. The selection flag for the list may be context coded by the video encoder 200 to apply in an optimal way. For example, if the distance of the MV is less than 1 pel, the video encoder 200 may signal the selection flag for the first distance list. In another example, if the distance of the MV is 2 pels or greater, the video encoder 200 may signal the selection flag for the second distance list.

TABLE 5

First distance list

| | Distance IDX | | | |
|---|---|---|---|---|
| | 0 | 1 | 2 | 3 |
| Pixel distance | 1/4-pel | 1/2-pel | 3/4-pel | 5/4-pel |

TABLE 6

Second distance list

| | Distance IDX | | | |
|---|---|---|---|---|
| | 0 | 1 | 2 | 3 |
| Pixel distance | 1-pel | 2-pel | 4-pel | 8-pel |

J. Li, R.-L. Liao, C. S. Lim, "CE4-related: Improvement on ultimate motion vector expression", JVET-L0408, October 2018 (hereinafter, "JVET-L0408") provides three changes to extend original UMVE of JVET-L0054 as follows: 1) enhances the number of directions from 4 into 8 as shown in Tables 7 and 8; 2) provides 2 adaptive distance tables as shown in Tables 9 and 10; and 3) provides full pixel search points for large distance values.

TABLE 7

UMVE direction table of JVET-L0054

| | Direction IDX | | | |
|---|---|---|---|---|
| | 00 | 01 | 10 | 11 |
| x-axis | + | − | N/A | N/A |
| y-axis | N/A | N/A | + | − |

TABLE 8

Additional directional information table

| | Direction IDX | | | |
|---|---|---|---|---|
| | 00 | 01 | 10 | 11 |
| x-axis | + | − | + | − |
| y-axis | + | − | − | + |

Figure 11:
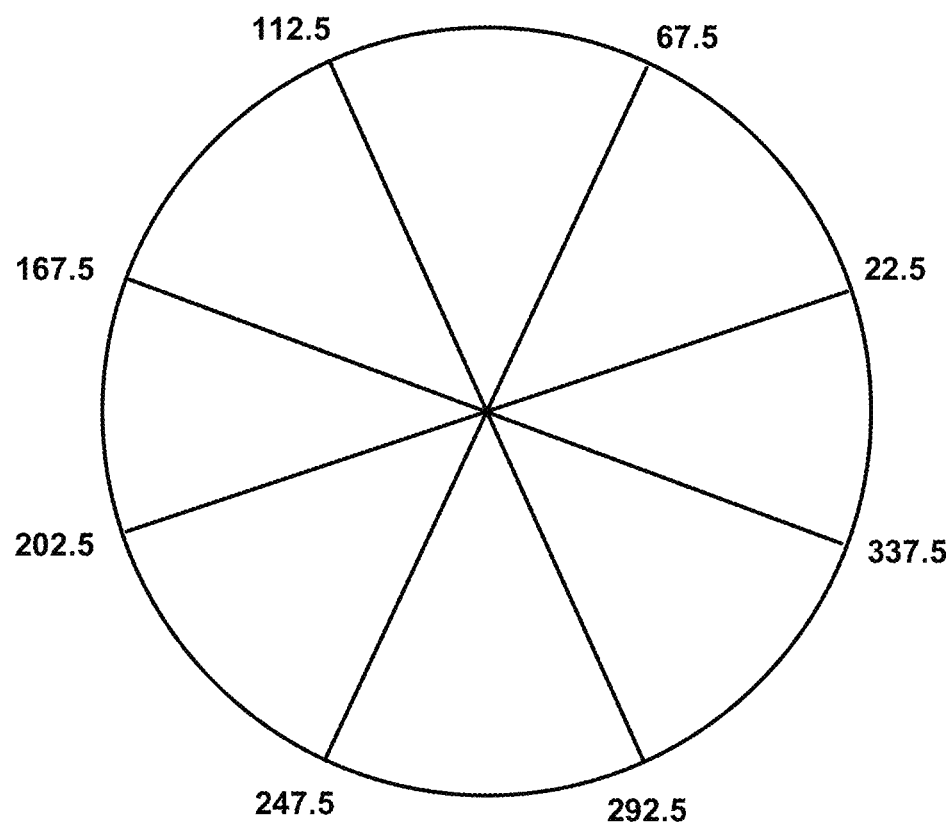
FIG. 11 is a conceptual diagram illustrates direction table selection.

An additional direction in Table 8 which supports diagonal directions is added to the original UMVE of JVET-L0054 direction table in Table 7. The video encoder 200 may select one of the two direction tables (i.e., Table 7 or Table 8) based on the angle of the base motion vector candidate. If the angle of the base motion vector candidate is within [22.5°, 67.5°], [112.5°, 157.5°], [202.5°, 247.5°] or [292.5°, 337.5°], the video encoder 200 selects the diagonal direction table in Table 8. Otherwise, the video encoder 200 selects the horizontal/vertical direction table in Table 7. An illustration of direction table selection is shown in FIG. 11. FIG. 11 depicts a circle divided into sections based upon angle. Each of these segments corresponds to one of the possible directions from direction table 7 and additional directional information table 8. For example, the video encoder 200 may select the additional directional information table 8, signal the additional direction information table 8 to the video decoder 300, and signal the direction index as 00 if the base motion vector candidate is within 22.5 and 67.5 degrees. If the base motion vector candidate is between 67.5 degrees and 112.5 degrees, the video encoder 200 may select the direction table 7, signal the direction table 7 to the video decoder and signal the direction index as 00.

The implementation of UMVE in JVET-L0054 has one fixed distance table (Table 9) for generating UMVE search points. The enhanced implementation of UMVE in JVET-L0408 uses an additional adaptive distance table shown in Table 10 based on picture resolution as described below. The adaptive distance table may be adapted based on frequency of use of a given distance.

TABLE 9

CE4.5.4 UMVE distance table

| | Distance IDX | | | | | | | |
|---|---|---|---|---|---|---|---|---|
| | 0 | 1 | 2 | 3 | 4 | 5 | 6 | 7 |
| Pixel distance | 1/4-pel | 1/2-pel | 1-pel | 2-pel | 4-pel | 8-pel | 16-pel | 32-pel |

TABLE 10

Additional UMVE distance table proposed in JVET-L0408

| | Distance IDX | | | | | | | |
|---|---|---|---|---|---|---|---|---|
| | 0 | 1 | 2 | 3 | 4 | 5 | 6 | 7 |
| Pixel distance | 1-pel | 2-pel | 4-pel | 8-pel | 16-pel | 32-pel | 64-pel | 128-pel |

If the picture resolution is not larger than 2K, i.e., 1920×1080, the video encoder 200 may select Table 9 as the base distance table. Otherwise, the video encoder 200 may select Table 10 as the base distance table.

The video encoder 200 and the video decoder 300 may reorder the distance index according to the usage of each distance index in previous coded pictures ranking from high to low. For example, assuming Table 9 is used as the base distance table and 2-pel is used most times in previous coded picture, 2-pel distance may be assigned to index 0 instead of 3.

To reduce complexity, the enhanced UMVE candidate values may be modified so that the CUs of UMVE mode have full-pixel instead of sub-pixel motion vectors if the UMVE distance is greater than a threshold. In the current implementation, 16-pixel distance is used as the threshold.

The previous UMVEs described in JVET-L0054, JVET-L0355, and JVET-L0408 all adopt fixed sets for motion vector (MV) expression. The enhanced UMVEs of JVET-L0355 and JVET-L0408 extend the directional information sets. The enhanced UMVEs of JVET-L0355 and JVET-L0408 also adaptively select 1 set table among 2 fixed set tables during coding. However, having fixed directional information sets causes a large amount of side information, such as frequent and large adjustments to motion vectors, to be encoded and decoded. The large amount of coded side information may deteriorate UMVE coding performance of both the video encoder 200 and the video decoder 300. This disclosure describes techniques to address reduce the amount of side information being coded and thus reduce the deterioration of the UMVE coding performance.

The video encoder 200 and the video decoder 300 may apply any of the following techniques, including any combination thereof.

Figure 12:
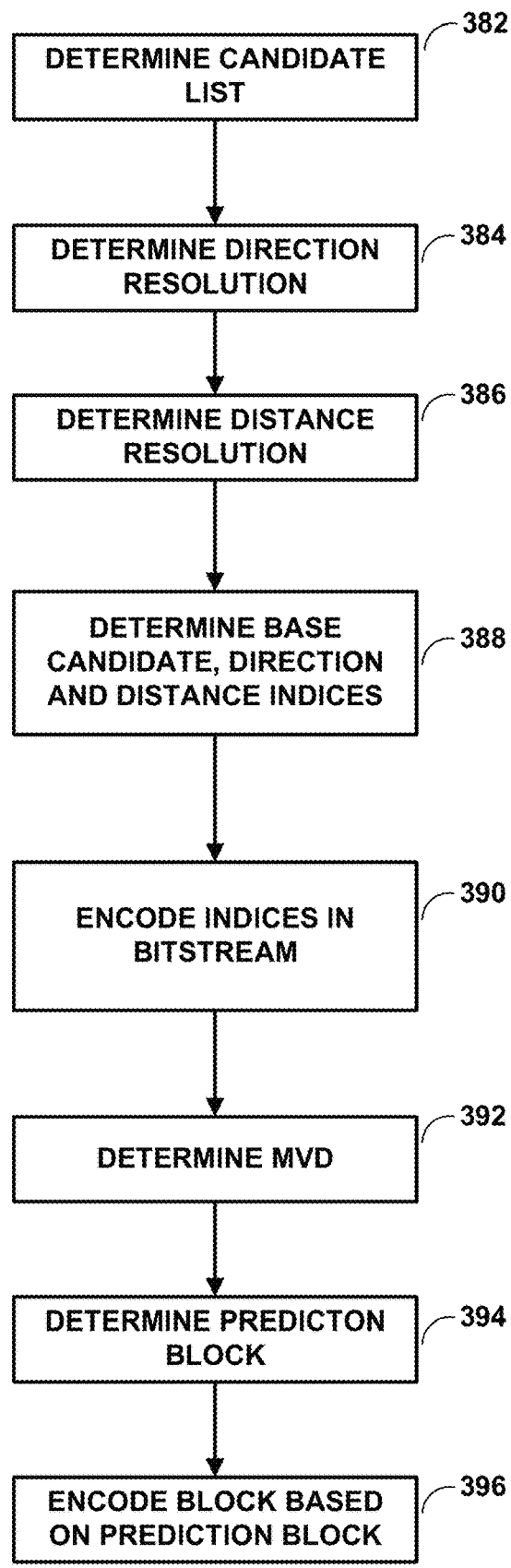
FIG. 12 is a flowchart illustrating an example method of encoding video data in accordance with techniques of this disclosure.

FIG. 12 is a flowchart showing techniques for encoding video data according to the present disclosure. In the example of FIG. 12, the motion estimation unit 222 of the video encoder 200 may derive direction information, including a distance resolution and a direction resolution, from spatial neighboring blocks. The motion estimation unit 222 of the video encoder 200 may determine a candidate list for the current block from spatial neighboring blocks and a base candidate (382). The motion estimation unit 222 or the UMVE unit 228 of the video encoder 200 may then determine the direction resolution based on motion vectors of one or more spatial neighboring blocks in a set of spatial neighboring blocks that spatially neighbor a current block of the video data (384). For example, the motion estimation unit 222 or the UMVE unit 228 of the video encoder 200 may check one or more spatial neighboring blocks that have a motion vector with them and set the direction resolution for the current block based on the motion vector of the spatial neighboring block(s). The motion estimation unit 222 or the UMVE unit 228 of the video encoder 200 may also determine a distance resolution based on the motion vectors of the one or more spatial neighboring blocks (386). For example, the motion estimation unit or the UMVE unit 228 of the video encoder 200 may check one or more spatial neighboring blocks that have a motion vector associated with them and set the distance resolution to the distance resolution of the current block based on the motion vector of the spatial neighboring block(s). The UMVE unit 228 of the video encoder 200 (e.g., the motion estimation unit 222) may also determine a base candidate index, a direction index and a distance index (388). For example, the UMVE unit 228 may look up the base candidate in a base candidate list, and select the index that is associated with the selected base candidate. UMVE unit 228 may also look up the direction resolution in a direction table and determine which direction index most closely matches the direction resolution. Similarly, the UMVE unit 228 may look up the distance resolution in the distance table and determine which distance index most closely matches the distance resolution in a distance table. The video encoder 200 may encode the direction index and the distance index into the bitstream (390) to be decoded by the video decoder 300. The direction index and the distance index may be stored in the direction table and the distance table, respectively, in memory in the video encoder 200 (e.g., the video data memory 230) and the video decoder 300 (e.g., the CPB memory 320). The direction table and the distance table may be fixed prior to coding and may be modified by the video encoder 200 (e.g., the motion estimation unit 222) during coding based on directional information from spatial neighboring blocks and modified by video decoder 300 (e.g., the motion compensation unit 316) based upon directional information from spatial neighboring blocks. For example, the UMVE unit 228 of video encoder 200 may determine that current direction resolutions in the direction table and/or current distance resolutions in the distance tables are not optimal. For example, the distance table may only contain distance resolutions that are shorter than many of the distances of the motion vectors of spatial neighboring blocks. In this example, the UMVE unit 228 may update the distance table with a new distance resolution or multiple new distance resolutions and signal in the bitstream how the distance table has been updated so that the UMVE unit 332 of the video decoder 300 may similarly update its distance table. The UMVE unit 228 may similarly update the direction resolution(s) contained in the direction table if the direction resolution(s) are not optimal and signal in the bitstream how the direction table has been updated so that the UMVE unit 332 of the video decoder 300 may update its direction table.

The video encoder 200 may determine an MVD based on the direction and the distance associated with the direction and distance indices (392). For example, the UMVE unit 228 of the video encoder 200 may look up the direction and distance indices in the direction and distance tables and calculate the MVD by combining the direction and distance indicated by the direction and distance indices. The video encoder 200 may then determine a prediction block using the MVD and a motion vector of the base candidate(s) (394). For example, the video encoder 200 (e.g., the mode selection unit 202) may select a prediction block by adding the MVD to the motion vector of the base candidate(s). The video encoder 200 may then encode the current block based on the prediction block (396).

Figure 13:
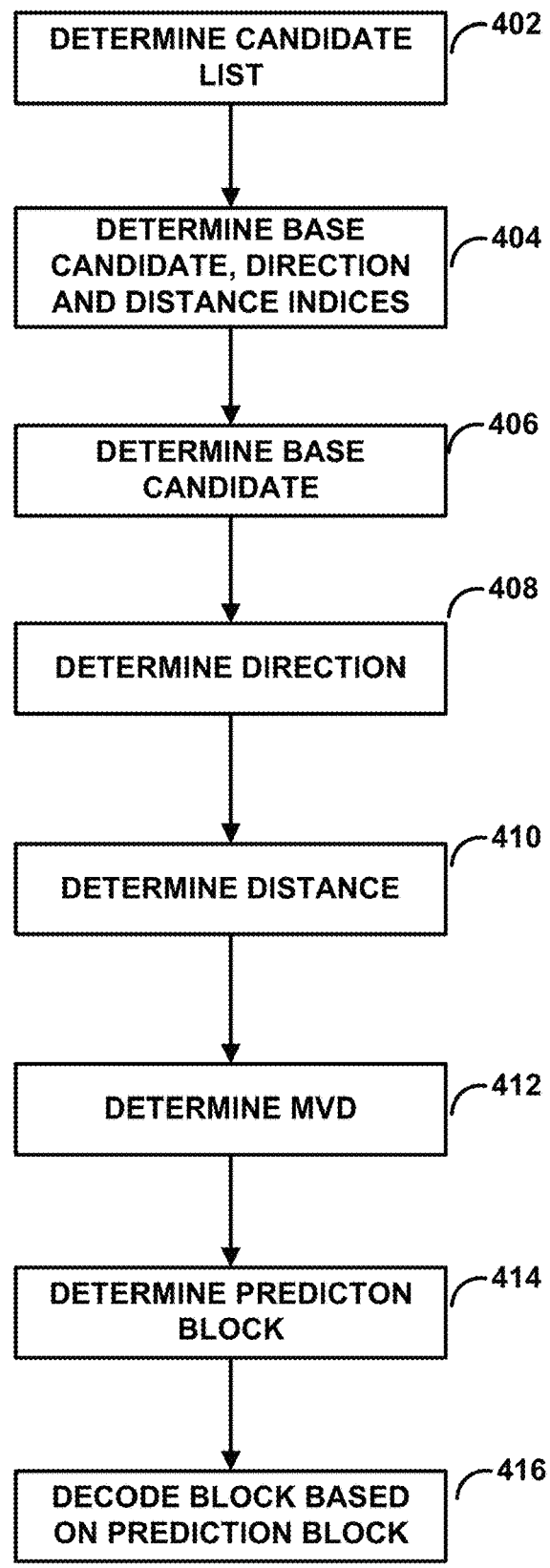
FIG. 13 is a flowchart illustrating an example method of decoding video data in accordance with techniques of this disclosure.

FIG. 13 is a flowchart showing techniques for decoding video data according to the present disclosure. In the example of FIG. 13, the UMVE unit 332 of the video decoder 300 may derive direction information from spatial neighboring blocks. Particularly, in the example of FIG. 13, the motion compensation unit 316 of the video decoder 300 may determine a candidate list for the current block from, for example, spatial neighboring blocks (402). The motion compensation unit 316 or the UMVE unit 332 of the video decoder 300 may determine a base candidate index, a direction index and a distance index (404). The base candidate index, the direction index and the distance index may be encoded in the bitstream by the video encoder 200 and decoded by the video decoder 300. The base candidate index, the direction index and the distance index may be stored in a base candidate list, a direction table and a distance table, respectively, in memory in the video encoder 200 (e.g., the video data memory 230) and the video decoder 300 (e.g., the CPB memory 320). The direction table and the distance table may be fixed prior to coding and may be modified by the video encoder 200 during coding based on directional information from spatial neighboring blocks and may be modified by video decoder 300 based upon directional information from spatial neighboring blocks, as discussed above.

The motion compensation unit 316 or the UMVE unit 332 of the video decoder 300 may determine a base candidate(s) based upon the base candidate index by looking up the base candidate index in the base candidate list (406). The UMVE unit 332 of the video decoder 300 may determine a direction based on the direction index by looking up the direction index in the direction index table (408). The UMVE unit 332 of the video decoder 300 may determine a distance based on the distance index by looking up the distance index in the distance index table (410).

The UMVE unit 332 of the video decoder 300 may determine an MVD based on the direction and the distance (412). For example, the UMVE unit 332 of the video decoder 300 may look up the direction and distance indices in the direction and distance tables and calculate the MVD by combining the direction and distance indicated by the direction and distance indices. The motion compensation unit 316 of the video decoder 300 may determine a prediction block using the MVD and a motion vector of the base candidate (414). For example, the video decoder 300 (e.g., the prediction processing unit 304) may select a prediction block by adding the MVD to the motion vector of the base candidate. The video decoder 300 (e.g., the entropy decoding unit 302, the inverse quantization unit 306, the inverse transform processing unit 308, the reconstruction unit 310, the filter unit 312 and the decoded buffer unit 314) may then decode the current block based on the prediction block (416).

Figure 14:
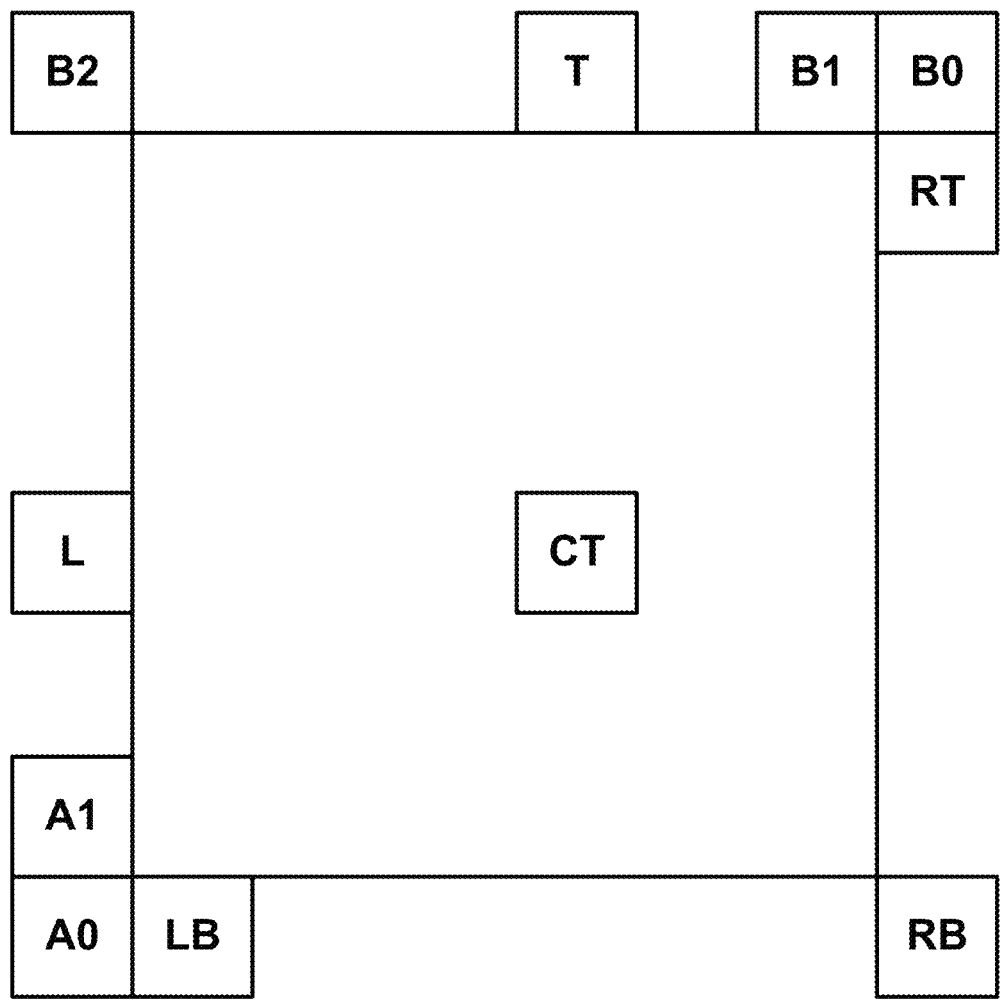
FIG. 14 is a conceptual diagram illustrating spatial neighboring blocks of a current block according to techniques of the current disclosure.

FIG. 14 is a conceptual diagram illustrating spatial neighboring blocks of a current block. The current block is spatially neighbored by blocks A0, A1, L, B2, T, B1, B0, RT, RB and LB. The current block also has a co-located temporal block CT. In some examples, the UMVE unit 228 of the video encoder 200 and the UMVE unit 332 of the video decoder 300 may determine the direction resolution and/or distance resolution from the MVs of the spatial neighboring blocks. For example, the UMVE unit 228 of the video encoder 200 and the UMVE unit 332 of the video decoder 300 may determine the direction resolution and/or distance resolution from the MVs of a neighboring block immediately below and to the left of a sample in the lower-left corner of the current block in the set of the spatially neighboring blocks (A0), a neighboring block immediately to the left of the sample in the lower-left corner of the current block in the set of the spatially neighboring blocks (A1), a neighboring block immediately above and to the right of a sample in the upper-right corner of the current block in the set of the spatially neighboring blocks (B0), a neighboring block immediately above the sample in the upper-right corner of the current block in the set of the spatially neighboring blocks (B1), and a neighboring block immediately above and to the left of a sample in the upper-left corner of the current block in the set of the spatially neighboring blocks (B2) as shown in FIG. 14, if available (e.g., the spatial neighboring block has already been encoded or decoded). For example, the UMVE unit 228 of the video encoder 200 and the UMVE unit 332 of the video decoder 300 may determine the direction resolution and/or distance resolution by averaging the direction resolution and/or distance resolution for the available spatial neighboring blocks of A0, A1, B0, B1 and B2. In another example, the UMVE unit 228 of the video encoder 200 and the UMVE unit 332 of the video decoder 300 may determine the direction resolution and/or distance resolution by taking the first available direction resolution and/or distance resolution from the spatial neighboring blocks of A0, A1, B0, B1 and B2. In some examples, the UMVE unit 228 of the video encoder 200 and the UMVE unit 332 of the video decoder 300 may determine the direction resolution and/or distance resolution from the MVs of center-left (L) neighboring block in the set of spatial neighboring blocks and center-top (T) neighboring block in the set of spatial neighboring blocks in FIG. 14, if available. For example, the UMVE unit 228 of the video encoder 200 and the UMVE unit 332 of the video decoder 300 may determine the direction resolution and/or distance resolution by averaging the direction resolution and/or distance resolution for the available spatial neighboring blocks of L and T. In another example, the UMVE unit 228 of the video encoder 200 and the UMVE unit 332 of the video decoder 300 may determine the direction resolution and/or distance resolution by taking the first available direction resolution and/or distance resolution from the spatial neighboring blocks of L and T.

In yet other examples, the UMVE unit 228 of the video encoder 200 and the UMVE unit 332 of the video decoder 300 may determine the direction resolution and/or distance resolution from the MVs of neighboring blocks that are between a first neighboring block in the set of spatial neighboring blocks and a second neighboring block in the set of spatial neighboring blocks, where the first neighboring block is immediately left of a sample in an upper-right corner of the current block (B1) and the second neighboring block is immediately above and left of a sample in the top-right corner of the current block (B2) in FIG. 14, if available. For example, the UMVE unit 228 of the video encoder 200 and the UMVE unit 332 of the video decoder 300 may determine the direction resolution and/or distance resolution by averaging the direction resolution and/or distance resolution for the available spatial neighboring blocks between B1 and B2. In another example, the UMVE unit 228 of the video encoder 200 and the UMVE unit 332 of the video decoder 300 may determine the direction resolution and/or distance resolution by taking the first available direction resolution and/or distance resolution from the spatial neighboring blocks between B1 and B2.

In another example, the UMVE unit 228 of the video encoder 200 and the UMVE unit 332 of the video decoder 300 may determine the direction resolution and/or distance resolution from the MVs of neighboring blocks that are between a first neighboring block in the set of spatial neighboring blocks and a second neighboring block in the set of spatial neighboring blocks, where the first neighboring block is immediately left of a sample in an lower-left corner of the current block (A1) and the second neighboring block is immediately above and left of a sample in the top-right corner of the current block (B2) in FIG. 14, if available. For example, the UMVE unit 228 of the video encoder 200 and the UMVE unit 332 of the video decoder 300 may determine the direction resolution and/or distance resolution by averaging the direction resolution and/or distance resolution for the available spatial neighboring blocks between A1 and B2. In another example, the UMVE unit 228 of the video encoder 200 and the UMVE unit 332 of the video decoder 300 may determine the direction resolution and/or distance resolution by taking the first available direction resolution and/or distance resolution from the spatial neighboring blocks between A1 and B2.

Figure 15:
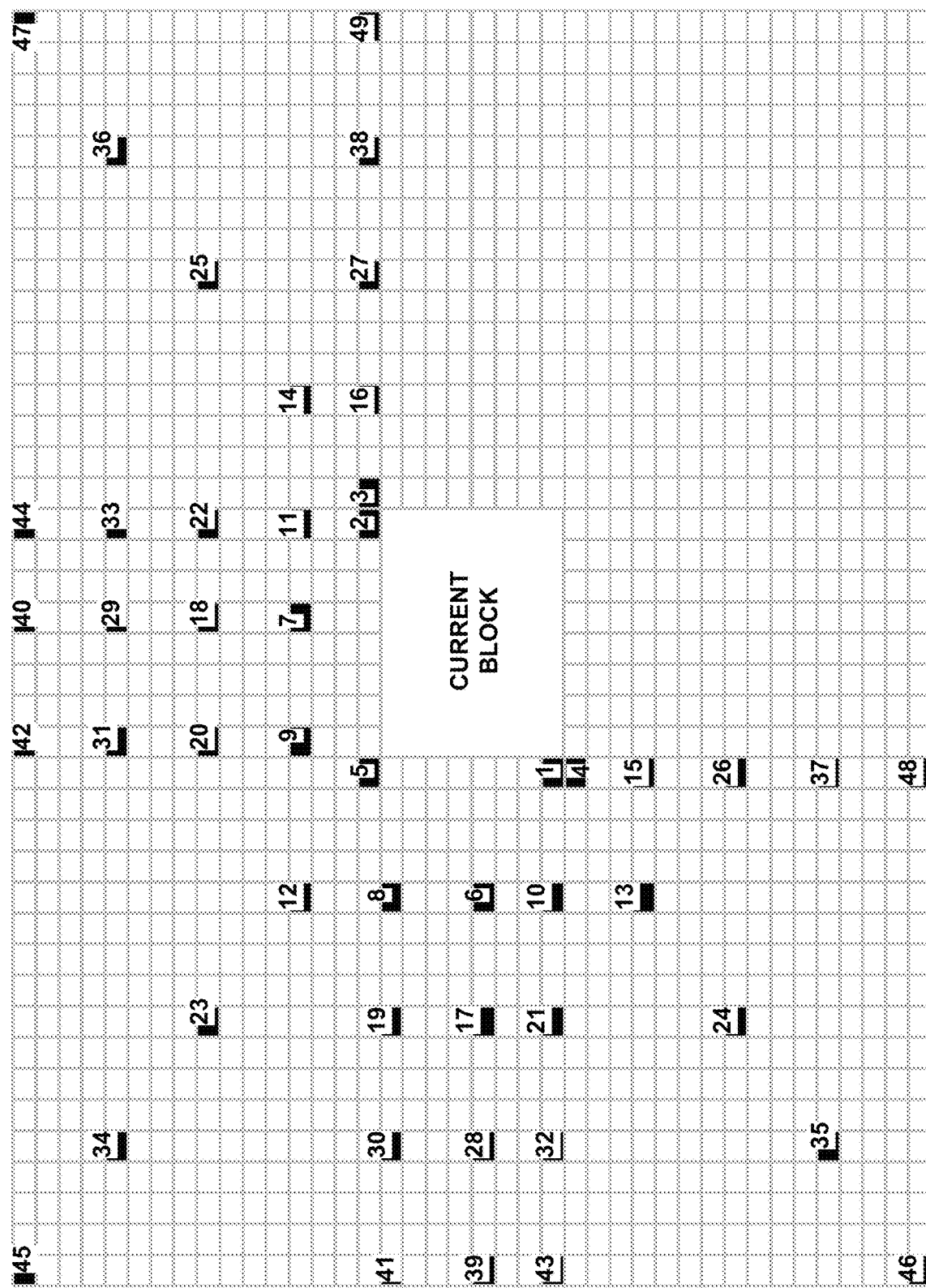
FIG. 15 is a conceptual diagram illustrating non-adjacent neighboring blocks according to techniques of the current disclosure.

FIG. 15 is a conceptual diagram illustrating non-adjacent spatial neighboring blocks. FIG. 15 depicts a current block, adjacent spatial neighboring blocks 1-5 and non-adjacent spatial neighboring blocks 6-49. In some examples, the UMVE unit 228 of the video encoder 200 and the UMVE unit 332 of the video decoder 300 may determine the direction resolution and/or distance resolution from the MVs of one or more spatial neighboring blocks that are not adjacent to the current block, such as any of blocks 6-49, if available. For example, the UMVE unit 228 of the video encoder 200 and the UMVE unit 332 of the video decoder 300 may determine the direction resolution and/or distance resolution by averaging the direction resolution and/or distance resolution for the available non-adjacent spatial neighboring blocks 6-10, for instance. In another example, the UMVE unit 228 of the video encoder 200 and the UMVE unit 332 of the video decoder 300 may determine the direction resolution and/or distance resolution by taking the first available direction resolution and/or distance resolution from the non-adjacent spatial neighboring blocks 6-10, for instance.

The determined directional information may include a flexible distance resolution number and a flexible direction resolution number. That is, the determined direction information may be used to dynamically adjust the direction table and/or the distance table such that a given direction index and/or a given distance index will point to a different distance and/or direction in the distance and/or direction table after the table is adjusted.

The available neighboring block may contain its motion vector resolution information. For example, the neighboring block may have been encoded by the video encoder 200 or decoded by the video decoder 300 and the motion vector associated with the neighboring block may be known and available. The distance resolution may be determined based on the known available neighboring motion vector resolutions. For a block coded in merge mode, its best prediction block will probably be located near the location pointed to by the original merge MV. Thus, a smaller UMVE distance may help locate the best prediction block. Thus, the video encoder 200 and the video decoder 300 may limit the determined UMVE distance to a distance smaller than the neighboring motion vector resolution. For example, if the neighboring motion vector resolution is 1 pixel, the determined UMVE distance may include ½ pixel, ¼ pixel, or other value less than 1 pixel. If the neighboring motion vector resolution is 4 pixels, the determined UMVE resolution will include 2 pixels, 1 pixel, or other value less than 4 pixels. So the distance may be smaller than the distance resolution.

Alternatively, the video encoder 200 and the video decoder 300 may limit the determined UMVE distance to distances equal to or slightly larger than the available neighboring motion vector resolution, for example not larger than twice the size of the neighboring motion vector resolution. For example, if the neighboring motion vector resolution is 1 pixel, the determined UMVE distance may include 1 pixel and 2 pixels, or other values larger than or equal to 1 pixel. If the neighboring motion vector resolution is 4 pixels, the determined UMVE resolution may include 4 pixels, 8 pixels, or other values larger than or equal to 4 pixels.

The determined distance resolution number may be less than those disclosed in JVET-K0115, JVET-L0054, JVET-L0355, and JVET-L0408 and thus can be coded with fewer bits. According to the techniques of the present disclosure, a determined UMVE direction resolution is shown in Table 11.

TABLE 11

Possible determined UMVE direction resolution

| | Direction IDX | | | | | | | |
|---|---|---|---|---|---|---|---|---|
| | 000 | 001 | 010 | 011 | 100 | 101 | 110 | 111 |
| x-axis | +1 | −1 | 0 | 0 | +1 | −1 | −1 | +1 |
| y-axis | 0 | 0 | +1 | −1 | +1 | −1 | +1 | −1 |

The available neighboring block may contain its motion vector direction information. In other words, the available neighboring block may have been encoded by the video encoder 200 or decoded by the video decoder 300 and the motion vector associated with the available neighboring block may be known. The UMVE unit 228 of the video encoder 200 may determine the direction resolution of UMVE based on the available neighboring motion vector direction information. If the neighboring motion direction is within [67.5°, 112.5°] in FIG. 11, the determined direction resolution may be 010 as shown in Table 11. If the neighboring motion direction is within [67.5°, 112.5°] and [22.5°, 67.5°], the determined direction resolution will be 010 and 100, respectively, as shown in Table 11.

Alternatively, the UMVE unit 228 of the video encoder 200 may determine the UMVE direction resolution to include directions that are near the neighboring motion vector direction. For example, if the neighboring motion direction is within [67.5°, 112.5°] in FIG. 11, the determined direction resolution may be 010, 100, and 110 as shown in Table 11.

The determined direction resolution number may be less than those in JVET-K0115, JVET-L0054, JVET-L0355, and JVET-L0408 and can be coded with fewer bits.

The original UMVE in JVET-K0115, JVET-L0054, JVET-L0355, and JVET-L0408 provide a fixed number of direction and distance resolutions. According to the techniques of the present disclosure, the determined directional information may include flexible distance resolution numbers and flexible direction resolution numbers. That is, the determined directional information may be used to dynamically adjust the entries in the direction table and the distance table. The determined UMVE distance number may be decided based on the neighboring blocks' motion vector resolution. The determined UMVE direction number may be decided based on the neighboring blocks' motion vector direction.

The techniques of this disclosure may reduce the amount of side information, such as large and frequent MVDs, signaled and may provide better coding performance.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a list of candidates for a current block of the video data from one or more spatial neighboring blocks in a set of spatial neighboring blocks that spatially neighbor the current block of video data;
   determining a distance resolution and a direction resolution for a motion vector of at least one of the candidates;
   determining, based on data obtained from a bitstream that comprises an encoded representation of the video data, a base candidate index, a direction index and a distance index;
   determining a base candidate based on the base candidate index;
   determining a direction based on the direction index, the direction index pointing to the direction in a direction table;
   determining a distance based on the distance index, the distance index pointing to the distance in a distance table;
   adapting one or more of the direction table or the distance table based on the distance resolution or the direction resolution;
   determining a motion vector difference (MVD) based on the direction and the distance;
   determining a prediction block using the MVD and a motion vector of the base candidate; and
   decoding the current block based on the prediction block.

2. The method of claim 1,
   wherein the base candidate is one or more of a center-left neighboring block in the set of spatial neighboring blocks and a center-top neighboring block in the set of spatial neighboring blocks.

3. The method of claim 1,
   wherein the base candidate is one or more spatial neighboring blocks in the set of spatial neighboring blocks that are between a first neighboring block in the set of spatial neighboring blocks and a second neighboring block in the set of spatial neighboring blocks, the first neighboring block being immediately left of a sample in an upper-right corner of the current block, the second neighboring block being immediately above and left of a sample in a top-right corner of the current block.

4. The method of claim 1,
   wherein the base candidate is one or more spatial neighboring blocks in the set of spatial neighboring blocks that are between a first neighboring block in the set of spatial neighboring blocks and a second neighboring block in the set of spatial neighboring blocks, the first neighboring block being immediately left of a sample in a lower-left corner of the current block, the second neighboring block being immediately above and left of a sample in a top-right corner of the current block.

5. The method of claim 1,
   wherein the base candidate is one or more spatial neighboring blocks in the set of spatial neighboring blocks that are not adjacent to the current block.

6. The method of claim 1,
   wherein the base candidate is one or more of:
      a neighboring block immediately below and left of a sample in a lower-left corner of the current block in the set of the spatial neighboring blocks,
      a neighboring block immediately left of the sample in the lower-left corner of the current block in the set of the spatial neighboring blocks,
      a neighboring block immediately above and right of a sample in an upper-right corner of the current block in the set of the spatial neighboring blocks,
      a neighboring block immediately above the sample in the upper-right corner of the current block in the set of the spatial neighboring blocks, or
      a neighboring block immediately above and to the left of a sample in an upper-left corner of the current block in the set of the spatial neighboring blocks.

7. A device for decoding video data, the device comprising:
   a memory configured to store a current block of the video data; and
   one or more processors coupled to the memory, the one or more processors configured to:
      determine a list of candidates for the current block from a set of spatial neighboring blocks that spatially neighbor the current block of video data;
      determine a distance resolution and a direction resolution for a motion vector of at least one of the candidates;
      determine, based on data obtained from a bitstream that comprises an encoded representation of the video data, a base candidate index, a direction index and a distance index;
      determine a base candidate based on the base candidate index;
      determine a direction based on the direction index, the direction index pointing to the direction in a direction table;
      determine a distance based on the distance index, the distance index pointing to the distance in a distance table;
      adapt one or more of the direction table or the distance table based on the distance resolution or the direction resolution;
      determine a motion vector difference (MVD) based on the direction and the distance;
      determine a prediction block using the MVD and a motion vector of the base candidate; and
      decode the current block based on the prediction block.

8. The device of claim 7, wherein the base candidate is one or more of a center-left neighboring block in the set of spatial neighboring blocks and a center-top neighboring block in the set of spatial neighboring blocks.

9. The device of claim 7,
   wherein the base candidate is one or more spatial neighboring blocks in the set of spatial neighboring blocks that are between a first neighboring block in the set of spatial neighboring blocks and a second neighboring block in the set of spatial neighboring blocks, the first neighboring block being immediately left of a sample in an upper-right corner of the current block, the second neighboring block being immediately above and left of a sample in a top-right corner of the current block.

10. The device of claim 7,
wherein the base candidate is one or more spatial neighboring blocks in the set of spatial neighboring blocks that are between a first neighboring block in the set of spatial neighboring blocks and a second neighboring block in the set of spatial neighboring blocks, the first neighboring block being immediately left of a sample in a lower-left corner of the current block, the second neighboring block being immediately above and left of a sample in a top-right corner of the current block.

11. The device of claim 7,
wherein the base candidate is one or more spatial neighboring blocks in the set of spatial neighboring blocks that are not adjacent to the current block.

12. The device of claim 7, wherein the base candidate is one or more of:
a neighboring block immediately below and left of a sample in a lower-left corner of the current block in the set of the spatial neighboring blocks,
a neighboring block immediately left of the sample in the lower-left corner of the current block in the set of the spatial neighboring blocks,
a neighboring block immediately above and right of a sample in an upper-right corner of the current block in the set of the spatial neighboring blocks,
a neighboring block immediately above the sample in the upper-right corner of the current block in the set of the spatial neighboring blocks, or
a neighboring block immediately above and left of a sample in an upper-left corner of the current block in the set of the spatial neighboring blocks.

13. A device for encoding video data comprising:
a memory configured to store a current block of the video data; and
one or more processors coupled to the memory, the one or more processors configured to:
determine a list of candidates for the current block of video data from spatial neighboring blocks in a set of spatial neighboring blocks that spatially neighbor the current block of the video data;
determine a base candidate for the current block of video data;
determine a direction resolution based on motion vectors of one or more base candidates;
determine a distance resolution based on the motion vectors of the one or more base candidates;
determine a base candidate index, a direction index and a distance index based upon the one or more base candidates, the direction resolution and the distance resolution;
adapt one or more of a direction table or a distance table based on the direction resolution or the distance resolution;
encode the base candidate index, the direction index and the distance index into a bitstream;
determine a motion vector difference (MVD) based on a direction and a distance associated with the direction index and the distance index;
determine a prediction block using the MVD and a motion vector of the one or more base candidates; and
encode the current block based on the prediction block.

14. The device of claim 13, wherein the one or more processors are configured to determine the direction resolution by determining the direction resolution from one or more of a motion vector of a center-left neighboring block in the set of spatial neighboring blocks and a motion vector of a center-top neighboring block in the set of spatial neighboring blocks; and
wherein the one or more processors are configured to determine the distance resolution by determining the distance resolution from one or more of the motion vector of the center-left neighboring block and the motion vector of the center-top neighboring block.

15. The device of claim 13,
wherein the one or more processors are configured to determine the direction resolution by determining the direction resolution from motion vectors of one or more spatial neighboring blocks in the set of spatial neighboring blocks that are between a first neighboring block in the set of spatial neighboring blocks and a second neighboring block in the set of spatial neighboring blocks, the first neighboring block being immediately left of a sample in an upper-right corner of the current block, the second neighboring block being immediately above and left of a sample in a top-right corner of the current block; and
wherein the one or more processors are configured to determine the distance resolution by determining the distance resolution from one or more of the motion vector of the first neighboring block and the motion vector of the second neighboring block.

16. The device of claim 13,
wherein the one or more processors are configured to determine the direction resolution by determining the direction resolution from one or more motion vectors of spatial neighboring blocks in the set of spatial neighboring blocks that are between a first neighboring block in the set of spatial neighboring blocks and a second neighboring block in the set of spatial neighboring blocks, the first neighboring block being immediately left of a sample in a lower-left corner of the current block, the second neighboring block being immediately above and left of a sample in a top-right corner of the current block; and
wherein the one or more processors are configured to determine the distance resolution by determining the distance resolution from one or more of the motion vector of the first neighboring block and the motion vector of the second neighboring block.

17. The device of claim 13,
wherein the one or more processors are configured to determine the direction resolution by determining the direction resolution from motion vectors of one or more spatial neighboring blocks in the set of spatial neighboring blocks that are not adjacent to the current block; and
wherein the one or more processors are configured to determine the distance resolution by determining the distance resolution from the motion vectors of the one or more spatial neighboring blocks in the set of spatial neighboring blocks that are not adjacent to the current block.

18. The device of claim 13,
wherein the one or more processors are configured to determine the direction resolution by determining the direction resolution from one or more motion vectors of;
a neighboring block immediately below and left of a sample in a lower-left corner of the current block in the set of the spatial neighboring blocks, a neighboring block immediately left of the sample in the lower-left corner of the current block in the set of the spatial neighboring blocks, a neighboring block immediately above and right of a sample in an upper-right corner of the current block in the set of the spatial neighboring blocks, a neighboring block immediately above the sample in the upper-right corner of the current block in the set of the spatial neighboring blocks, or a neighboring block immediately above and left of a sample in an upper-left corner of the current block in the set of the spatial neighboring blocks; and wherein the one or more processors are configured to determine the distance resolution by determining the distance resolution from one or more of motion vectors of a neighboring block immediately below and left of the sample in the lower-left corner of the current block in the set of the spatial neighboring blocks, a neighboring block immediately left of the sample in the lower-left corner of the current block in the set of the spatial neighboring blocks, a neighboring block immediately above and right of the sample in the upper-right corner of the current block in the set of the spatial neighboring blocks, a neighboring block immediately above the sample in the upper-right corner of the current block in the set of the spatial neighboring blocks, or a neighboring block immediately above and to the left of the sample in the upper-left corner of the current block in the set of the spatial neighboring blocks.

19. The device of claim 13, wherein the distance is smaller than the distance resolution.

20. A device for decoding video data comprising:
means for determining a list of candidates for the current block of the video data from one or more spatial neighboring blocks in a set of spatial neighboring blocks that spatially neighbor for a current block of the video data;
means for determining a distance resolution and a direction resolution for a motion vector of at least one of the candidates;
means for determining, based on data obtained from a bitstream that comprises an encoded representation of the video data, a base candidate, a direction index and a distance index;
means for determining a base candidate based on the base candidate index;
means for determining a direction based on the direction index, the direction index pointing to the direction in a direction table;
means for determining a distance based on the distance index, the distance index pointing to the distance in a distance table;
means for adapting one or more of the direction table or the distance table based on the distance resolution or the direction resolution;
means for determining a motion vector difference (MVD) based on the direction and the distance;
means for determining a prediction block using the MVD and a motion vector of the base candidate; and
means for decoding the current block based on the prediction block.

21. The device of claim 20, wherein the base candidate is one or more of a center-left neighboring block in the set of spatial neighboring blocks and a center-top neighboring block in the set of spatial neighboring blocks.

22. The device of claim 20,
wherein the base candidate is one or more spatial neighboring blocks in the set of spatial neighboring blocks that are between a first neighboring block in the set of spatial neighboring blocks and a second neighboring block in the set of spatial neighboring blocks, the first neighboring block being immediately left of a sample in an upper-right corner of the current block, the second neighboring block being immediately above and left of a sample in a top-right corner of the current block.

23. The device of claim 20,
wherein the base candidate is one or more spatial neighboring blocks in the set of spatial neighboring blocks that are between a first neighboring block in the set of spatial neighboring blocks and a second neighboring block in the set of spatial neighboring blocks, the first neighboring block being immediately left of a sample in a lower-left corner of the current block, the second neighboring block being immediately above and left of a sample in a top-right corner of the current block.

24. The device of claim 20,
wherein the base candidate is one or more of spatial neighboring blocks in the set of spatial neighboring blocks that are not adjacent to the current block.

25. The device of claim 20,
wherein the base candidate is one or more of:
a neighboring block immediately below and left of a sample in a lower-left corner of the current block in the set of the spatial neighboring blocks,
a neighboring block immediately left of the sample in the lower-left corner of the current block in the set of the spatial neighboring blocks,
a neighboring block immediately above and right of a sample in an upper-right corner of the current block in the set of the spatial neighboring blocks,
a neighboring block immediately above the sample in the upper-right corner of the current block in the set of the spatial neighboring blocks, or
a neighboring block immediately above and left of a sample in an upper-left corner of the current block in the set of the spatial neighboring blocks.

* * * * *